US012126998B2

(12) United States Patent
Bang et al.

(10) Patent No.: US 12,126,998 B2
(45) Date of Patent: Oct. 22, 2024

(54) ELECTRONIC DEVICE FOR PERFORMING NETWORK MANAGEMENT OPERATION AND OPERATING METHOD THEREOF

(71) Applicant: SAMSUNG ELECTRONICS CO., LTD., Suwon-si (KR)

(72) Inventors: Hyejung Bang, Suwon-si (KR); Buseop Jung, Suwon-si (KR); Sunkey Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 305 days.

(21) Appl. No.: 17/677,175

(22) Filed: Feb. 22, 2022

(65) Prior Publication Data

US 2022/0312207 A1 Sep. 29, 2022

Related U.S. Application Data

(63) Continuation of application No. PCT/KR2022/000572, filed on Jan. 12, 2022.

(30) Foreign Application Priority Data

Mar. 24, 2021 (KR) ........................ 10-2021-0038176

(51) Int. Cl.
*H04W 12/06* (2021.01)
*H04W 4/23* (2018.01)
(Continued)

(52) U.S. Cl.
CPC ........... *H04W 12/068* (2021.01); *H04W 4/23* (2018.02); *H04W 4/80* (2018.02); *H04W 12/03* (2021.01); *H04W 12/0431* (2021.01)

(58) Field of Classification Search
CPC ....... H04W 12/068; H04W 4/23; H04W 4/80; H04W 12/03; H04W 12/0431;
(Continued)

(56) References Cited

U.S. PATENT DOCUMENTS

2016/0270020 A1* 9/2016 Adrangi .............. G06F 16/9554
2016/0360407 A1 12/2016 Benoit et al.
(Continued)

FOREIGN PATENT DOCUMENTS

EP       4 271 019        11/2023
JP       2020-072442       5/2020
(Continued)

OTHER PUBLICATIONS

Search Report and Written Opinion issued Apr. 22, 2022 in counterpart International Patent Application No. PCT/KR2022/000572.
(Continued)

*Primary Examiner* — Mohammed Waliullah
(74) *Attorney, Agent, or Firm* — Nixon & Vanderhye, P.C.

(57) ABSTRACT

According to various embodiments, an electronic device may comprise: a communication circuit and at least one processor operatively connected with the communication circuit, and the at least one processor may be configured to: determine a network role of an external electronic device, transmit, to the external electronic device via the communication circuit, an authentication request message including network role information indicating the network role, receive, from the external electronic device via the communication circuit, an authentication response message to the authentication request message, receive, from the external electronic device via the communication circuit, a configuration request message including network role information of the external electronic device and requesting network configuration information, generate network configuration information to be transmitted to the external electronic device corresponding to the network role information, and transmit, to the external electronic device via the commu-
(Continued)

nication circuit, a configuration response message including the generated network configuration information.

20 Claims, 17 Drawing Sheets

(51) Int. Cl.
*H04W 4/80* (2018.01)
*H04W 12/03* (2021.01)
*H04W 12/0431* (2021.01)

(58) Field of Classification Search
CPC ....... H04W 4/50; H04W 12/06; H04W 48/16; H04W 88/18; H04L 63/08; H04L 63/105; H04L 67/1061; H04L 67/54; H04L 63/18
See application file for complete search history.

(56) References Cited

U.S. PATENT DOCUMENTS

| | | | |
|---|---|---|---|
| 2017/0294448 A1* | 10/2017 | Debacker | H01L 27/11807 |
| 2018/0054845 A1 | 2/2018 | Lee et al. | |
| 2018/0109381 A1* | 4/2018 | Cammarota | H04W 12/041 |
| 2018/0109418 A1 | 4/2018 | Cammarota et al. | |
| 2018/0316562 A1 | 11/2018 | Lepp et al. | |
| 2019/0123964 A1 | 4/2019 | Lepp et al. | |
| 2019/0306710 A1* | 10/2019 | Cammarota | H04W 12/06 |
| 2020/0146101 A1 | 5/2020 | Tsuboi | |
| 2020/0154276 A1 | 5/2020 | Minakawa | |
| 2021/0243685 A1* | 8/2021 | Tachibana | H04W 76/10 |

FOREIGN PATENT DOCUMENTS

| | | | |
|---|---|---|---|
| JP | 2020072442 A * | 5/2020 | ............ H04W 12/04 |
| KR | 10-2016-0112563 | 9/2016 | |
| KR | 10-2019-0068549 | 6/2019 | |
| KR | 10-2020-0028473 | 3/2020 | |

OTHER PUBLICATIONS

Extended Search Report dated Jun. 19, 2024 in European Patent Application No. 22775878.6.
"Draft Device Provisioning Protocol Specification Version 1.2," Wi-Fi Alliance, Mar. 3, 2020, pp. 1-174.

* cited by examiner

ELECTRONIC DEVICE FOR PERFORMING NETWORK MANAGEMENT OPERATION AND OPERATING METHOD THEREOF

CROSS-REFERENCE TO RELATED APPLICATIONS

This application is a continuation of International application No. PCT/KR2022/000572 designating the United States, filed on Jan. 12, 2022, in the Korean Intellectual Property Receiving Office and claiming priority to Korean Patent Application No. 10-2021-0038176, filed on Mar. 24, 2021 in the Korean Intellectual Property Office, the disclosures of each of which are incorporated by reference herein in their entireties.

BACKGROUND

Field

The disclosure relates to an electronic device for performing network management operation and an operating method thereof.

Description of Related Art

A wireless communication system is being developed widely in order to provide various types of communication services such as voice or data. Generally, the wireless communication system may refer to a multiple access system which is capable of supporting a communication with a plurality of electronic devices by sharing available system resources (e.g., a frequency resource, a bandwidth resource, or an output power resource). Multiple access systems may include, for example, a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

Various wireless communication technologies are being developed along with the development of an information communication technology. Specially, a wireless local area network (WLAN) technology is technology which may allow an access to Internet in a wireless manner at a home, an office, or a specific service provision area using an electronic device such as a smart phone, a personal digital assistant (PDA), or a laptop computer based on a wireless frequency technology.

In order to secure flexibility of a communication between devices in a WLAN system, various protocols have been proposed for a direct communication between devices without intervention of a management entity such as a base station (BS) or an access point (AP). Specially, Wi-Fi alliance (WFA) which is based on a Wi-Fi standard has developed a device provisioning protocol (DPP) capable of simply and efficiently connecting a Wi-Fi device which does not have a user interface (UI) or has a limited UI to a Wi-Fi network.

In a DPP technology which has been standardized by WFA based on a Wi-Fi standard, a plurality of configurators may be used for provisioning. If it is required that the plurality of configurators are used, a configurator, e.g., an existing configurator, which has already been activated needs to perform a configurator delegation operation for delegating authority to a new configurator to share network management and provide a backup for a configurator function.

However, a current DPP technology specifies that the plurality of configurators may be used, and the existing configurator performs the configurator delegation operation for the new configurator, but the current DPP technology does not specify how the plurality of configurators are configured in detail.

Further, the current DPP technology specifies that the plurality of configurators may be used and that the existing configurator performs the configurator delegation operation for the new configurator, but does not specify how a plurality of network configurators share network configuration information in detail.

SUMMARY

Various embodiments of the disclosure may provide an electronic device for performing a network management operation and an operating method thereof.

Various embodiments of the disclosure may provide an electronic device for performing a configurator delegation operation and an operating method thereof in a DPP network.

Various embodiments of the disclosure may provide an electronic device for setting a network role and an operating method thereof in a DPP network.

Various embodiments of the disclosure may provide an electronic device for transmitting and receiving network configuration information suitable for a network role and an operating method thereof in a DPP network.

Various embodiments of the disclosure may provide an electronic device for transmitting and receiving network role information and an operating method thereof in a DPP network.

Various embodiments of the disclosure may provide an electronic device for controlling a network role of an enrollee and an operating method thereof in a DPP network.

Various embodiments of the disclosure may provide an electronic device for configuring a plurality of configurators and an operating method thereof in a DPP network.

Various embodiments of the disclosure may provide an electronic device for controlling a network role of an enrollee to activate a new configurator and an operating method thereof in a DPP network.

According to various example embodiments of the disclosure, an electronic device may comprise: a communication circuit and at least one processor operatively connected with the communication circuit, and the at least one processor may be configured to: determine a network role of an external electronic device, transmit, to the external electronic device via the communication circuit, an authentication request message including network role information indicating the network role, receive, from the external electronic device via the communication circuit, an authentication response message to the authentication request message, receive, from the external electronic device via the communication circuit, a configuration request message including network role information of the external electronic device and requesting network configuration information, generate network configuration information to be transmitted to the external electronic device corresponding to the network role information, and transmit, to the external electronic device via the communication circuit, a configuration response message including the generated network configuration information.

According to various example embodiments of the disclosure, an electronic device may comprise: a communication circuit, and at least one processor operatively connected with the communication circuit, and the at least one processor may be configured to: determine a network role of an external electronic device, transmit, to the external electronic device via the communication circuit, an out-of-band (OOB) message including network role information indicating the network role, perform, via the communication circuit, an authentication operation with the external electronic device, receive, from the external electronic device via the communication circuit, a configuration request message including network role information of the external electronic device and requesting network configuration information, generate network configuration information to be transmitted to the external electronic device corresponding to the network role information, and transmit, to the external electronic device via the communication circuit, a configuration response message including the generated network configuration information.

According to various example embodiments of the disclosure, an electronic device may comprise: a communication circuit, and at least one processor operatively connected with the communication circuit, and the at least one processor may be configured to: receive, from an external electronic device via the communication circuit, an authentication request message including network role information indicating a network role of the electronic device, transmit, to the external electronic device via the communication circuit, an authentication response message to the authentication request message, transmit, to the external electronic device via the communication circuit, a configuration request message including network role information of the electronic device and requesting network configuration information, and receive, from the external electronic device via the communication circuit, a configuration response message including network configuration information determined corresponding to the network role information of the electronic device.

According to various embodiments of the disclosure, an electronic device may comprise: a communication circuit, and at least one processor operatively connected with the communication circuit, and the at least one processor may be configured to: receive, from an external electronic device via the communication circuit, an out-of-band (OOB) message including network role information indicating a network role of the electronic device, perform, via the communication circuit, an authentication operation with the electronic device, transmit, to the external electronic device via the communication circuit, a configuration request message including network role information of the electronic device and requesting network configuration information, and receive, from the external electronic device via the communication circuit, a configuration response message including network configuration information determined corresponding to the network role information of the electronic device.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
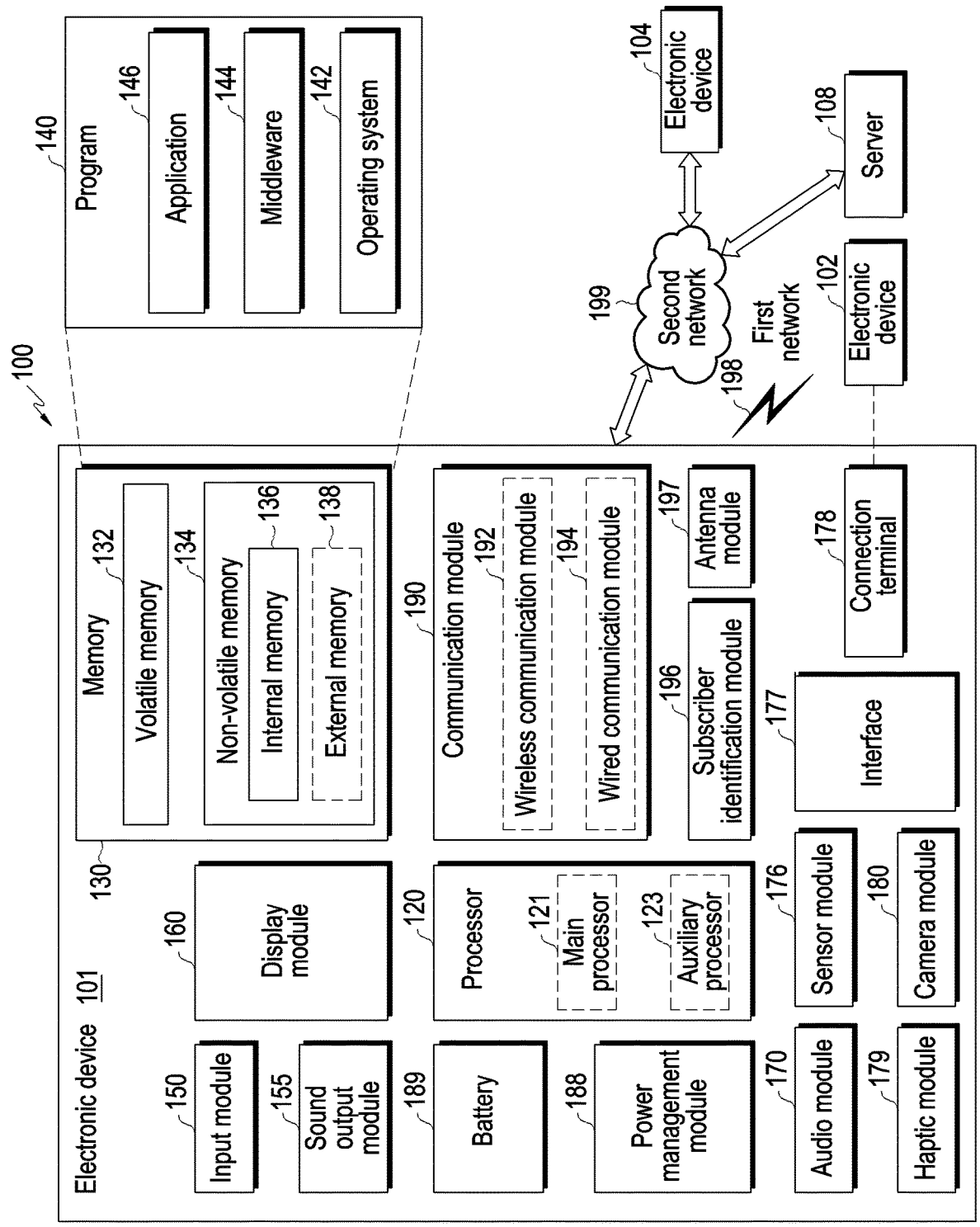
FIG. 1 is a block diagram illustrating an example electronic device within a network environment according to various embodiments.

Hereinafter, various example embodiments of the disclosure will be described in greater detail with reference to the accompanying drawings. In the following description of various embodiments of the disclosure, a detailed description of relevant known functions or configurations incorporated herein may be omitted when it is determined that the description may make the subject matter of various embodiments of the disclosure unnecessarily unclear. The terms which will be described below are terms defined in consideration of the functions in the disclosure, and may be different according to users, intentions of the users, or customs. Therefore, the definitions of the terms should be made based on the contents throughout the disclosure.

It should be noted that the technical terms used herein are simply used to describe specific embodiments, and are not intended to limit the disclosure. The technical terms used herein should be interpreted to have the same meaning as those commonly understood by a person skilled in the art to which the disclosure pertains, and should not be interpreted have excessively comprehensive or excessively restricted meanings unless particularly defined as other meanings. When the technical terms used herein are incorrect technical terms that cannot correctly represent the idea of the disclosure, it should be appreciated that they are replaced by technical terms correctly understood by those skilled in the art. The general terms used herein should be interpreted as defined in dictionaries or interpreted in the context of the relevant part, and should not be interpreted to have excessively restricted meanings.

A singular expression used herein may include a plural expression unless they are definitely different in the context. As used herein, such an expression as "comprises" or "include", or the like should not be interpreted to necessarily include all elements or all operations described in the disclosure, and should be interpreted to be allowed to exclude some of them or further include additional elements or operations.

The terms including an ordinal number, such as expressions "a first" and "a second" may be used to describe various elements, but the corresponding elements should not be limited by such terms. These terms are used merely to distinguish between one element and any other element. For example, a first element may be termed a second element, and similarly, a second element may be termed a first element without departing from the scope of the disclosure.

It should be understood that when an element is referred to as being "connected" or "coupled" to another element, it may be connected or coupled directly to the other element, or any other element may be interposed between them. It should be understood that when an element is referred to as being "directly connected" or "directly coupled" to another element, there are no element interposed between them.

Hereinafter, various example embodiments of the disclosure will be described in greater detail with reference to the accompanying drawings. Regardless of drawing signs, the same or like elements are provided with the same reference numeral, and a repeated description thereof may be omitted. In describing various embodiments of the disclosure, a detailed description of relevant known technologies may be omitted when it is determined that the description may make the subject matter of the disclosure unclear. It should be noted that the accompanying drawings are presented merely to aid in understanding of the technical idea of the disclosure, and should not be construed to limit the technical idea of the disclosure. The technical idea of the disclosure should be construed to cover all changes, equivalents, and alternatives, in addition to the drawings.

Hereinafter, a terminal will be described in various embodiments of the disclosure, and the terminal may be referred to as an electronic device, a mobile station, a mobile equipment (ME), a user equipment (UE), a user terminal (UT), a subscriber station (SS), a wireless device, a handheld device, an access terminal (AT), or the like. In various embodiments of the disclosure, the terminal may be a device having a communication function such as, for example, and without limitation, a mobile phone, a personal digital assistant (PDA), a smart phone, a wireless MODEM, a notebook, or the like.

In a detailed description of various embodiments of the disclosure, standards provided by institute of electrical and electronics engineers (IEEE) which is a wireless access standardization organization and Wi-Fi alliance (WFA) are referred to, and the subject of the disclosure can be modified and applied to other communication systems having a similar technical background without departing from the scope of the disclosure, and the modifications can be made on the basis of determination of those skilled in the art.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1$^{st}$" and "2$^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

WFA has proposed a device provisioning protocol (DPP) based on a Wi-Fi technology, and the DPP is a protocol capable of simply and efficiently connecting a Wi-Fi device which does not have a user interface (UI) or has a limited UI to a Wi-Fi network.

Figure 2:
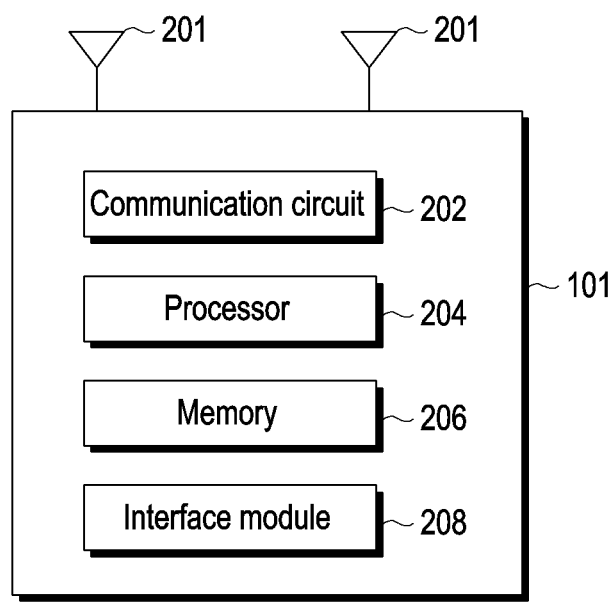
FIG. 2 is a block diagram illustrating an example configuration of an electronic device according to various embodiments.

FIG. 2 is a block diagram illustrating an example configuration of an electronic device 101 according to various embodiments.

Referring to FIG. 2, an electronic device (e.g., an electronic device 101 in FIG. 1) may be a device implementing a DPP. Hereinafter, for convenience of a description, the device implementing the DPP will be referred to as a DPP device.

The electronic device 101 may include a communication circuit 202 (e.g., a communication module 190 in FIG. 1) which transmits and receives signals with an external electronic device (e.g., an electronic device 102 or 104 in FIG. 1), for example, a peer device using one or more antennas 201.

The electronic device 101 may include a processor (e.g., including processing circuitry) 204 (e.g., a processor 120 in FIG. 1) which may be implemented in one or more single-core processors or one or more multi-core processors, and a memory 206 (e.g., a memory 130 in FIG. 1) which stores instructions for an operation of the electronic device 101.

The electronic device 101 may include an interface module (e.g., including interface circuitry) 208 (e.g., an interface 177 in FIG. 1) which provides a wired and/or wireless interface for communicating with components outside a network. At least a portion of the one or more antennas 201, the communication circuit 202, or the interface module 208 may be implemented as, for example, at least a portion of the communication module 190 and the antenna module 198 in FIG. 1.

According to various example embodiments of the disclosure, an electronic device (e.g., an electronic device 101) may comprise: a communication circuit (e.g., a communication circuit 202) and at least one processor (e.g., a processor 204) operatively connected with the communication circuit. The at least one processor may be configured to: determine a network role of an external electronic device (e.g., an electronic device 102 or an electronic device 104), transmit, to the external electronic device via the communication circuit, an authentication request message including network role information indicating the network role, receive, from the external electronic device via the communication circuit, an authentication response message comprising a response message to the authentication request message, receive, from the external electronic device via the communication circuit, a configuration request message including network role information of the external electronic device and requesting network configuration information, generate network configuration information to be transmitted to the external electronic device corresponding to the network role information, and transmit, to the external electronic device via the communication circuit, a configuration response message including the generated network configuration information.

According to various example embodiments of the disclosure, the at least one processor may be configured to: based on the network role information of the external electronic device indicating a configurator, generate the network configuration information to be transmitted to the external electronic device as envelope network configuration information, and the envelope network configuration information may include encrypted network configuration information generated by encrypting network configuration information managed by the electronic device based on an encryption scheme, and information about the encryption scheme.

According to various example embodiments of the disclosure, the information about the encryption scheme may include an encryption key.

According to various example embodiments of the disclosure, the at least one processor may be configured to: determine the network role of the external electronic device based on information input via a user interface (UI).

According to various example embodiments of the disclosure, the at least one processor may be configured to: receive, from the external electronic device via the communication circuit, a presence announcement message including capability information indicating a network role supportable in the external electronic device, and determine the network role of the external electronic device based on the capability information.

According to various example embodiments of the disclosure, the at least one processor may be configured to: receive, from the external electronic device via the communication circuit, an out-of-band (OOB) message including capability information indicating a network role supportable in the external electronic device, and determine the network role of the external electronic device based on the capability information.

According to various example embodiments of the disclosure, the at least one processor may be configured to: based on the network role information of the external electronic device indicating an access point (AP) or a station (STA), generate the network configuration information to be transmitted to the external electronic device as network configuration information managed by the electronic device.

According to various example embodiments of the disclosure, an electronic device (e.g., an electronic device 101) may comprise: a communication circuit (e.g., a communication circuit 202), and at least one processor (e.g., a processor 204) operatively connected with the communication circuit. The at least one processor may be configured to: determine a network role of an external electronic device (e.g., an electronic device 102 or an electronic device 104), transmit, to the external electronic device via the communication circuit, an out-of-band (OOB) message including network role information indicating the network role, perform, via the communication circuit, an authentication operation with the external electronic device, receive, from the external electronic device via the communication circuit, a configuration request message including network role information of the external electronic device and requesting network configuration information, generate network configuration information to be transmitted to the external electronic device corresponding to the network role information, and transmit, to the external electronic device via the communication circuit, a configuration response message including the generated network configuration information.

According to various example embodiments of the disclosure, based on the network role information of the external electronic device indicating a configurator, the at least one processor may be configured to: generate the network configuration information to be transmitted to the external electronic device as envelope network configuration information, and the envelope network configuration information may include encrypted network configuration information generated by encrypting network configuration information managed by the electronic device based on an encryption scheme, and information about the encryption scheme.

According to various example embodiments of the disclosure, the information about the encryption scheme may include an encryption key.

According to various example embodiments of the disclosure, the at least one processor may be configured to: determine the network role of the external electronic device based on information input via a UI.

According to various example embodiments of the disclosure, the at least one processor may be configured to: receive, from the external electronic device via the communication circuit, a presence announcement message including capability information indicating a network role supportable in the external electronic device, and determine the network role of the external electronic device based on the capability information.

According to various example embodiments of the disclosure, the at least one processor may be configured to: based on the network role information of the external electronic device indicating an AP or an STA, generate the network configuration information to be transmitted to the external electronic device as network configuration information managed by the electronic device.

According to various example embodiments of the disclosure, an electronic device (e.g., an electronic device 101) may comprise: a communication circuit (e.g., a communication circuit 202), and at least one processor (e.g., a processor 204) operatively connected with the communication circuit. The at least one processor may be configured to: receive, from an external electronic device (e.g., an electronic device 102 or 104) via the communication circuit, an authentication request message including network role information indicating a network role of the electronic device, transmit, to the external electronic device via the communication circuit, an authentication response message comprising a response message to the authentication request message, transmit, to the external electronic device via the communication circuit, a configuration request message including network role information of the electronic device and requesting network configuration information, and receive, from the external electronic device via the communication circuit, a configuration response message including network configuration information determined corresponding to the network role information of the electronic device.

According to various example embodiments of the disclosure, based on the network role information of the electronic device indicating a configurator, the network configuration information included in the configuration response message may include envelope network configuration information, and the envelope network configuration information may include encrypted network configuration information generated by encrypting network configuration information managed by the external electronic device based on an encryption scheme, and information about the encryption scheme.

According to various example embodiments of the disclosure, the information about the encryption scheme may include an encryption key.

According to various example embodiments of the disclosure, the at least one processor may be configured to: transmit, to the external electronic device via the communication circuit, a presence announcement message including capability information indicating a network role supportable in the electronic device, and the network role of the electronic device may be determined based on the capability information.

According to various example embodiments of the disclosure, the at least one processor may be configured to: transmit, to the external electronic device via the communication circuit, an OOB message including capability information indicating a network role supportable in the electronic device, and the network role of the electronic device may be determined based on the capability information.

According to various example embodiments of the disclosure, the OOB message may include a bluetooth low energy (BLE) advertisement message, and the BLE advertisement message may include information indicating a network role preferred by the electronic device.

According to various example embodiments of the disclosure, based on the network role information of the electronic device indicating an AP or an STA, the network configuration information included in the configuration response message may include network configuration information managed by the external electronic device.

According to various example embodiments of the disclosure, an electronic device (e.g., an electronic device 101) may comprise: a communication circuit (e.g., a communication circuit 202), and at least one processor (e.g., a processor 204) operatively connected with the communication circuit. The at least one processor may be configured to: receive, from an external electronic device (e.g., an electronic device 102 or 104) via the communication circuit, an out-of-band (OOB) message including network role information indicating a network role of the electronic device, perform, via the communication circuit, an authentication operation with the electronic device, transmit, to the external electronic device via the communication circuit, a configuration request message including network role information of the electronic device and requesting network configuration information, and receive, from the external electronic device via the communication circuit, a configuration response message including network configuration information determined corresponding to the network role information of the electronic device.

According to various example embodiments of the disclosure, based on the network role information of the electronic device indicating a configurator, the network configuration information included in the configuration response message may include envelope network configuration information, and the envelope network configuration information may include encrypted network configuration information generated by encrypting network configuration information managed by the external electronic device based on an encryption scheme, and information about the encryption scheme.

According to various example embodiments of the disclosure, the information about the encryption scheme includes an encryption key.

According to various example embodiments of the disclosure, the at least one processor may be configured to: transmit, to the external electronic device via the communication circuit, a presence announcement message including capability information indicating a network role supportable in the electronic device, and the network role of the electronic device may be determined based on the capability information.

According to various example embodiments of the disclosure, based on the network role information of the electronic device indicating an AP or an STA, the network configuration information included in the configuration response message may be network configuration information managed by the external electronic device.

In an embodiment, providing a process for easily and securely connecting a Wi-Fi device to a network may be essential for a continued growth and expansion of a Wi-Fi technology. For example, in a market such as a smart home or IoT where there are many Wi-Fi devices which do not have a UI or have a UI but have limitations on the UI, the process for easily and securely connecting the Wi-Fi device to the network may be more essential.

In order to configure a network connection of a Wi-Fi device, network information and a secure credential may need to be provided to the Wi-Fi device. In an embodiment of the disclosure, the secure credential may include information required for joining a peer-to-peer (P2P) group as defined in a Wi-Fi simple configuration specification. An operation of adding a Wi-Fi device which does not have a UI or has a limitation on a UI to a network may be cumbersome, and may be performed in a different way for each manufacturer of the Wi-Fi device.

There is a need for a Wi-Fi device configuration scheme which may easily and efficiently connect a Wi-Fi device to a Wi-Fi network, and for this, WFA has developed a DPP capable of simply and efficiently connecting a Wi-Fi device which does not have a UI or has a limited UI to a Wi-Fi network.

Based on a standardized mechanism, the DPP may simplify a configuration of the Wi-Fi device and directly connect the Wi-Fi device to the Wi-Fi network in a relatively easy way, for example, by scanning a product QR code with a smart phone. In an embodiment, the DPP may provide, for example, an improved user experience, enhanced security, and/or IoT device provisioning support while simplifying network setup and client device provisioning.

According to various embodiments, in the DPP, for example, in a network such as a home or an office, a network manager may set up an access point (AP) using a trusted device such as, for example, a smart phone, and manage network accesses of other client devices, for example, other client Wi-Fi devices. For example, the DPP is a protocol which enables a smooth user experience while maintaining a secure network connection using a robust cryptography principle.

Figure 3:
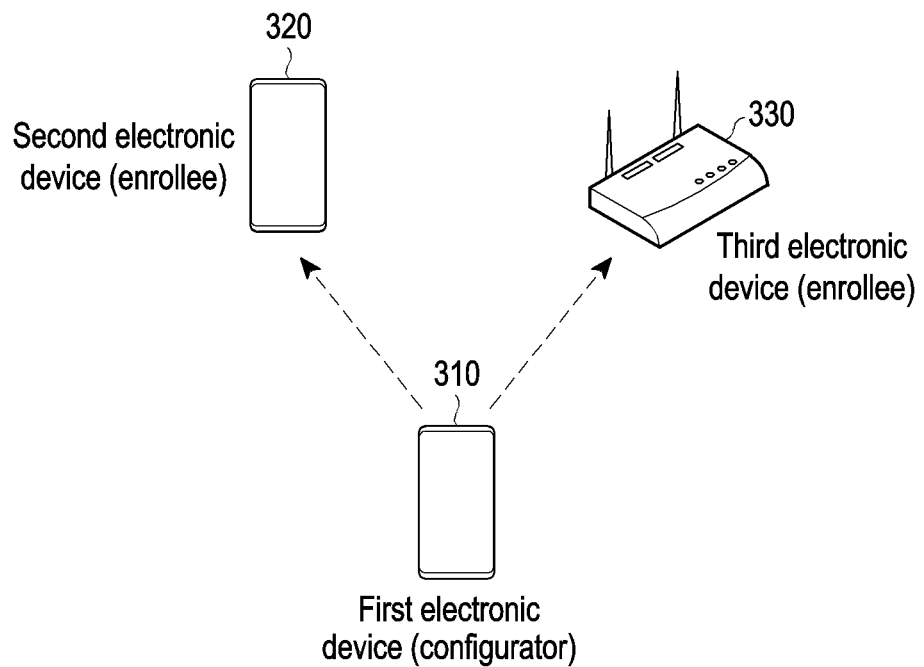
FIG. 3 is a diagram illustrating an example of an architecture of a DPP network according to various embodiments.

FIG. 3 is a diagram illustrating an example architecture of a DPP network according to various embodiments.

In an embodiment, an architecture of a DPP network illustrated in FIG. 3 may be an architecture according to a Wi-Fi provisioning role. Referring to FIG. 3, the DPP network may include a plurality of electronic devices, for example, an electronic device (e.g., a first electronic device 310), and external electronic devices (e.g., a second electronic device 320 and a third electronic device 330). In an embodiment, each of the first electronic device 310, the second electronic device 320, and the third electronic device 330 may be a DPP device.

A DPP architecture may define device roles during a DPP bootstrapping operation, a DPP authentication operation, a DPP provisioning (or configuration) operation, and a DPP connectivity (or introduction) operation, and the device roles may include two types, for example, a configurator and an enrollee, or an initiator and a responder. In the example illustrated in FIG. 3, the first electronic device 310 may operate as the configurator, and each of the second electronic device 320 and the third electronic device 330 may operate as the enrollee.

In the DPP network, the configurator may be a logical entity with capabilities to enroll and provision devices for a device-to-device (D2D) communication or an infrastructure communication.

In the DPP network, the initiator may represent a DPP device which initiates a DPP authentication protocol, and one of the configurator or the enrollee may be the initiator. In an embodiment, the responder may represent a DPP device which responds to initiation of the DPP authentication protocol by the initiator, and one of the configurator or the enrollee may be the responder.

The configurator may support setup of the enrollee, and the configurator and the enrollee may be involved in the DPP bootstrapping operation, the DPP authentication operation, and the DPP configuration operation. The configurator or the enrollee may operate as the initiator in the DPP bootstrapping operation and the DPP authentication operation. In contrast, the DPP configuration operation and the DPP introduction operation may only be initiated by the enrollee.

The configurator and the enrollee may possess bootstrapping keys from the same elliptic curve before starting the DPP authentication operation. In an embodiment, the elliptic curve may be an algorithm used for generating cryptographic keys. In an embodiment, if necessary (and depending on a bootstrapping method), bootstrapping keys may be generated upon request. The DPP authentication operation may require the initiator to obtain a bootstrapping key of the responder as part of a previous bootstrapping mechanism. Optionally, in the DPP authentication operation, the configurator and the enrollee may obtain each other's bootstrapping keys in order to provide mutual authentication.

After authentication is completed, the configurator may provision the enrollee for a D2D communication or an infrastructure communication. As part of this provisioning, the configurator may enable the enrollee to establish secure associations with other peers, for example, other external electronic devices in the DPP network.

In an embodiment of the disclosure, a detailed description of an example configurator and an example enrollee may be as follows.

In a DPP network, a specific DPP device, for example, a main DPP device may be designated as the configurator. The configurator as a central configuration point may provision all DPP devices included in the DPP network including an AP. One of various DPP devices included in the DPP network may be the configurator.

In an embodiment, the enrollee is a DPP device which a network manager of a DPP network wishes to connect to the DPP network. A DPP device which is added to the DPP network, for example, an AP, a smart home appliance, a computer, a printer, or a TV may be the enrollee, and all DPP devices capable of implementing a Wi-Fi function, except for a configurator, may be the enrollee.

Figure 4:
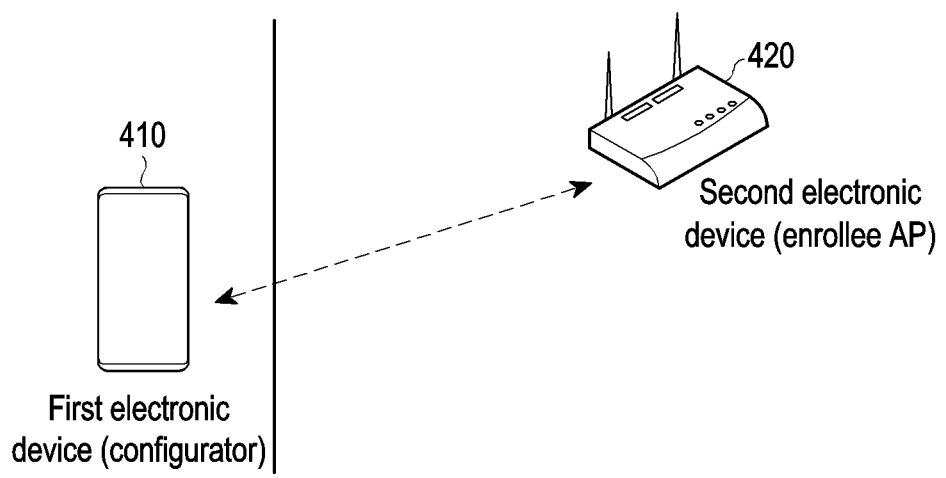
FIG. 4 is a diagram illustrating an example of a network configuration operation in a DPP network according to various embodiments.

FIG. 4 is a diagram illustrating an example network configuration operation in a DPP network according to various embodiments.

Referring to FIG. 4, a DPP network may include a plurality of electronic devices, e.g., an electronic device (e.g., a first electronic device 410) and an external electronic device (e.g., a second electronic device 420). In FIG. 4, each of the first electronic device 410 and the second electronic device 420 may be a DPP device, and it will be assumed that the first electronic device 410 operates as a configurator, and the second electronic device 420 operates as an enrollee AP.

In an embodiment, the first electronic device 410 may provision the second electronic device 420, e.g., an initial AP 420 which is an enrollee based on a DPP. The first electronic device 410 may provision enrollee clients (not shown separately in FIG. 4) which are other enrollees, thereby enabling enrollees to discover and select the DPP network, and connect to the DPP network.

As shown in FIG. 4, in an initial enrollment procedure, a network manager of the DPP network may configure the first electronic device 410, which is a mobile device, as a configurator, and then configure an AP (e.g., enrollee AP), e.g., the second electronic device 420 which is regarded as an enrollee through the first electronic device 410. Such an AP configuration operation may be performed before network connection, and the DPP network may be configured through such an AP configuration operation.

Figure 5:
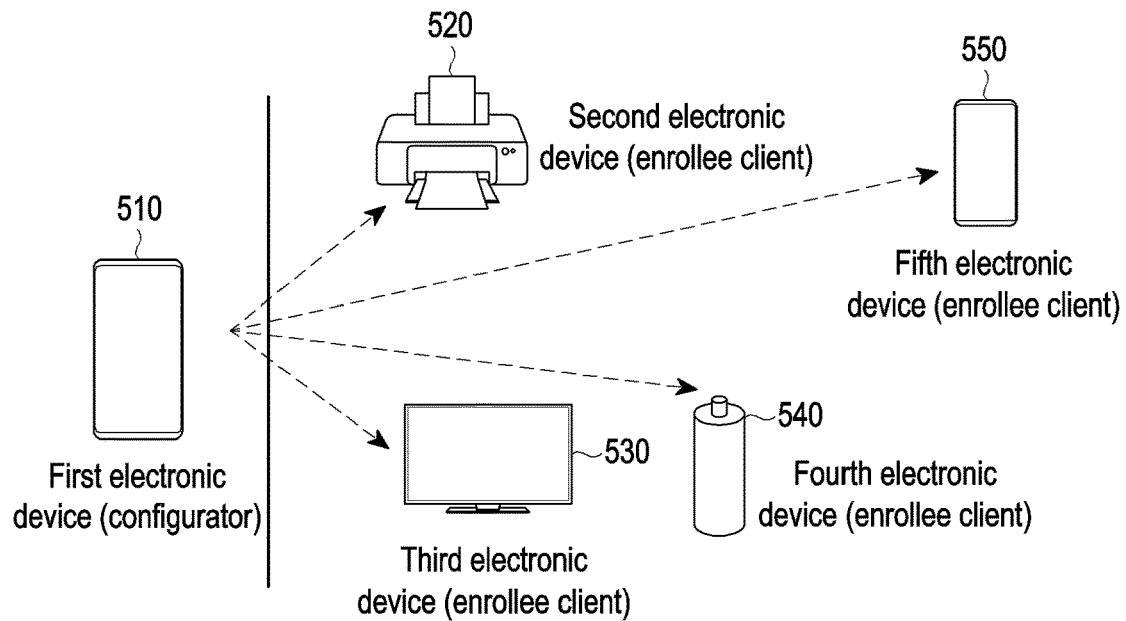
FIG. 5 is a diagram illustrating an example of an enrollment operation in a DPP network according to various embodiments.

FIG. 5 is a diagram illustrating an example enrollment operation in a DPP network according to various embodiments.

Referring to FIG. 5, after a DPP network is configured, a manager of the DPP network may initiate an enrollment procedure for enrolling DPP devices. In an embodiment, the DPP network may include a plurality of electronic devices, e.g., an electronic device (e.g., a first electronic device 510) and external electronic devices (e.g., a second electronic device 520, a third electronic device 530, a fourth electronic device 540, or a fifth electronic device 550). In FIG. 5, it will be assumed that the first electronic device 510 operates as a configurator, and each of the second electronic device 520, the third electronic device 530, the fourth electronic device 540, and the fifth electronic device 550 operates as an enrollee client.

At least one of the second electronic device 520, the third electronic device 530, the fourth electronic device 540, or the fifth electronic device 550 may obtain configuration for a connection to the DPP network based on information provisioned by the first electronic device 510. Then, the first electronic device 510 may generate a separate secure credential with a corresponding external electronic device, so the corresponding external electronic device may establish a connection to the DPP network. In an embodiment, the security credential may be information required to join a peer-to-peer (P2P) group.

Figure 6:
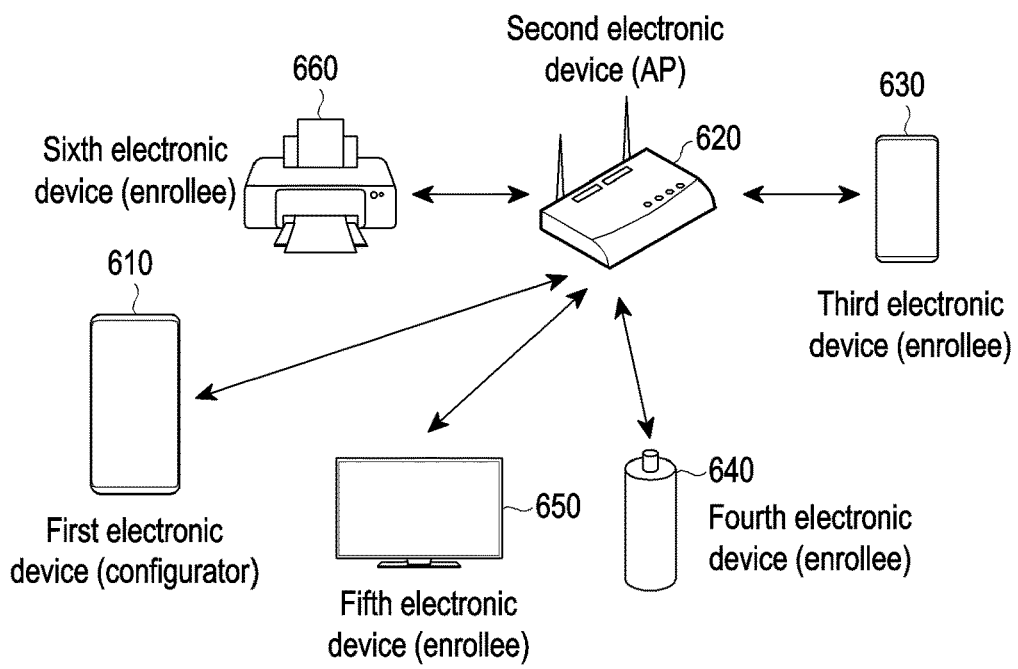
FIG. 6 is a diagram illustrating an example of a network connection operation in a DPP network according to various embodiments.

FIG. 6 is a diagram illustrating an example network connection operation in a DPP network according to various embodiments.

Referring to FIG. 6, after DPP devices are enrolled in a DPP network, a corresponding enrollee client may discover the DPP network through an AP 620 based on a configuration for a connection to the DPP network obtained in an enrollment procedure, and connect to the discovered DPP network. In an embodiment, the DPP network may include a plurality of electronic devices, e.g., an electronic device (e.g., a first electronic device 610) and external electronic devices (e.g., a second electronic device 620, a third electronic device 630, a fourth electronic device 640, a fifth electronic device 650, and a sixth electronic device 660). In FIG. 6, it will be assumed that the first electronic device 610 operates as a configurator, the second electronic device 620 operates as an AP, and each of the third electronic device 630, the fourth electronic device 640, the fifth electronic device 650, and the sixth electronic device 660 operates as an enrollee.

In an embodiment, the second electronic device 620 which is the AP may be connected to the first electronic device 610 which is the configurator, and at least one of the third electronic device 630, the fourth electronic device 640, the fifth electronic device 650, or the sixth electronic device 660 may discover the DPP network through the second electronic device 620, and connect to the discovered DPP network.

WFA has developed Wi-Fi Easy Connect to make an operation of adding a Wi-Fi device to a Wi-Fi network much simpler and more efficient. The Wi-Fi Easy Connect may support a bootstrapping mechanism, and the bootstrapping mechanism may be a mechanism which may minimize or reduce user's work per Wi-Fi device and add securely a configurator and an enrollee to the Wi-Fi network. The Wi-Fi Easy Connect may use an enrollee QR code to support the bootstrapping mechanism.

In an embodiment, the QR code may include various information such as, for example, a secure key and a unique identifier of a Wi-Fi device. The QR code may be recognized by a Wi-Fi device having a QR code scanning function, and prevent or reduce a hassle of a user having to manually input information for Wi-Fi device authentication. QR code may also prevent or reduce an issue which may occur due to a data input error.

An example of a provisioning operation using a QR code and a configurator in a Wi-Fi Easy Connect network is described.

(1) A QR code of an enrollee may be scanned using a camera which the configurator has. The QR code may be provided in a form of a sticker or a card.

(2) The configurator may read and decrypt the QR code to automatically discover a secure Wi-Fi communication link with the enrollee, and establish the secure Wi-Fi communication link with the enrollee based on the discovered result.

(3) The configurator may configure Wi-Fi network information to the enrollee using a secure channel.

(4) If configuration of the Wi-Fi network information for the enrollee is completed, the enrollee may use the Wi-Fi network information provided by the configurator to discover a Wi-Fi network without intervention of a user, select a specific Wi-Fi network based on the discovered result, and perform a connection operation to the selected Wi-Fi network.

In an embodiment, in a Wi-Fi Easy Connect network, if a configurator does not have a function capable of recognizing a QR code, or if an enrollee does not have a function of displaying the QR code, it may be possible to establish a Wi-Fi communication link between the configurator and the enrollee by directly inputting a string by a user.

In an embodiment, a Wi-Fi Easy Connect technology may be designed to be flexible to provision Wi-Fi devices in a variety of ways, and may support that a configurator or an enrollee initiates a provisioning operation. As may be seen from an example of the provisioning operation as described above, a Wi-Fi device, for example, a smart phone, which operates as the configurator may scan a QR code of a Wi-Fi device, for example, an IoT device which operates as the enrollee, and include the QR code of the IoT device into Wi-Fi network information to be provisioned.

In an embodiment, the configurator may provide the QR code of the enrollee for Wi-Fi configuration provisioning. For example, in a Wi-Fi network in a hotel, the configurator may provide the enrollee, for example, a hotel room TV with the QR code. A customer may scan the QR code provided through the hotel room TV using a smart phone which will perform a provisioning operation, and accordingly, the provisioning operation may be performed as described above. For example, the smart phone of the customer may be on-board to a Wi-Fi network of the hotel.

In an embodiment, a provisioning process proposed in a DPP may include a total of four operations, e.g., a DPP bootstrapping operation, a DPP authentication operation, a DPP configuration operation, and a DPP access operation. In an embodiment, the DPP access operation may also be referred to as a peer discovery operation. In an embodiment, in three operations up to the DPP bootstrapping operation, the DPP authentication operation, and the DPP configuration operation, one electronic device may operate as a configurator and an external electronic device may operate as an enrollee. In an embodiment, the configurator may perform an operation of configuring electronic devices connected to a DPP network as described above.

In an embodiment, an AP which is an enrollee may perform an operation of providing an access to a network as described above. In an embodiment, the enrollee may be an enrollee client or the AP, and if network configuration is completed, the enrollee may be connected to the AP to access the network or may operate as the AP to provide the access to the network.

A DPP bootstrapping operation, a DPP authentication operation, a DPP configuration operation, and DPP access operation will be described below.

According to an embodiment, in the DPP bootstrapping operation, DPP devices may exchange public bootstrapping keys to establish a secure provisioning connection. In an embodiment, the public bootstrapping keys may be secure information used in the DPP bootstrapping operation.

For example, an identifier (ID) is assigned to a DPP device, and a QR code or a string (a printed matter or digital) which a user may read may be included in the ID assigned to the DPP device in a form of a public key and a private key. In the DPP bootstrapping operation, a configurator and an enrollee may establish a trusted relationship to perform mutual authentication and establish a secure connection based on a result of the mutual authentication.

In an embodiment, as described above, in the DPP bootstrapping operation, public bootstrapping keys are exchanged, and the public bootstrapping keys are transmitted in one way or exchanged bidirectionally depending on whether mutual authentication between the configurator and the enrollee is required. In the DPP bootstrapping operation, for example, the public bootstrapping keys may be exchanged based on, for example, various schemes such as a QR code scheme, a Bluetooth scheme, a Bluetooth low energy (BLE) scheme, a near field communication (NFC) scheme, and a public key exchange (PKEX) scheme, or a cloud scheme.

In an embodiment, after the public bootstrapping keys are exchanged, a connection may be established between the configurator and the enrollee. In an embodiment, the public bootstrapping keys may be different from secure credentials received by the enrollee in a DPP configuration operation after the DPP bootstrapping operation. In an embodiment, bootstrapping information may be used in a DPP authentication operation and the DPP configuration operation after the DPP bootstrapping operation, and may include a small list of global operating class/channel pairs and a medium access control (MAC) address. In an embodiment, the small list of the global operating class/channel pairs may ideally include only one channel.

According to an embodiment, in the DPP authentication operation, DPP devices may establish a reliable and secure channel using bootstrapping keys in a DPP authentication protocol, and in the DPP configuration operation, a configurator may execute a DPP configuration protocol to provision an enrollee via a secure channel established during the DPP authentication operation. This will be described in detail as follows.

According to an embodiment, if a DPP bootstrapping operation is completed, the configurator and the enrollee may establish a secure Wi-Fi connection using the DPP authentication protocol. The configurator which is an initiator in the DPP authentication operation and the DPP configuration operation may request authentication to the enrollee which is a responder based on channel information obtained through the DPP bootstrapping operation. For example, the configurator may request the authentication by transmitting a DPP authentication request frame to the responder. In an embodiment, the DPP authentication request frame may include at least one of a hash for a public bootstrapping key of the responder, a hash for a public bootstrapping key of the initiator, a public protocol key of the initiator, or an initiator nonce attribute and an initiator capabilities attribute which are encrypted with a first intermediate key. In an embodiment, the at least one of the hash for the public bootstrapping key of the responder, the hash for the public bootstrapping key of the initiator, the public protocol key of the initiator, or the initiator nonce attribute and the initiator capabilities attribute which are encrypted with the first intermediate key included in the DPP authentication request frame may be secure information used in the DPP authentication operation.

In an embodiment, the enrollee may respond to an authentication request of the configurator while waiting on a corresponding channel based on the channel information obtained through the DPP bootstrapping operation. For example, the enrollee may respond to the authentication request by transmitting a DPP authentication response frame to the configurator. In an embodiment, the DPP authentication response frame may include at least one of the hash for the public bootstrapping key of the responder, the hash for the public bootstrapping key of the initiator, a public protocol key of the responder, or a responder nonce attribute, a responder capabilities attribute, and an initiator capabilities attribute which are encrypted with a second intermediate key. In an embodiment, the at least one of the hash for the public bootstrapping key of the responder, the hash for the public bootstrapping key of the initiator, the public protocol key of the responder, or the responder nonce attribute, the responder capabilities attribute, and the initiator capabilities attribute which are encrypted with the second intermediate key included in the DPP authentication response frame may be secure information used in the DPP authentication operation.

In an embodiment, as the DPP authentication operation is completed, a secure connection may be established between the configurator and the enrollee, and after the secure connection is established, the enrollee may start transaction for obtaining network configuration information from the configurator. For example, the responder may transmit a DPP configuration request frame to the configurator, and the configurator may transmit, to the responder, a DDP configuration response frame which is a response frame to the DDP configuration request frame. The responder may verify the secure credentials and network information obtained through the DPP configuration protocol, and transmit a result thereof to the configurator. As such a DPP configuration operation is completed, the enrollee may operate as an AP, or may discover a target AP, and be securely connected to the discovered target AP.

In an embodiment, encoded configuration information transmitted and received in a DPP configuration operation may include a DPP configuration object, the DPP configuration object may include the following DPP configuration object parameters, and the DPP configuration object may be a javascript object notation (JSON) encoded data structure. In an embodiment, the DPP configuration object may be referred to as network configuration information.

(1) Wi-Fi Technology Object

A Wi-Fi technology object may identify a Wi-Fi technology of a policy to be provisioned, and the Wi-Fi technology object may indicate a connection type such as an AP infra connection. In an embodiment, an enrollee may set a value of a Wi-Fi technology object included in a DDP configuration request frame to a value indicating a Wi-Fi technology to be provisioned, and a configurator may set a value of a Wi-Fi technology object included in a DPP configuration response frame to a value indicating a Wi-Fi technology which is used in an operation between the enrollee and the configurator. In an embodiment, a Wi-Fi technology object may indicate a Wi-Fi technology to be used in a DPP authentication operation, a DPP configuration operation, and/or the like.

(2) DPP Discovery Object

A DPP discovery object may include, for example, operating or discovery information such as a service set identifier (SSID), an operating channel, or an operating band, and/or the like.

(3) Credential Object

A credential object may include credential information which is provisioned by an enrollee to obtain a secure network access. The credential information may depend on a value of an authentication and key management (AKM) type parameter included in a DPP configuration object.

In an embodiment, in a DPP configuration operation, network configuration information, e.g., a DPP configuration object, including network information such as secure credential information and an SSID may be transmitted from a configurator to an enrollee. In an embodiment, the secure credential information may include a connector, the connector may be credential information provisioned by the enrollee, and the connector may be used by a pair of enrollees to set security association using a DPP network introduction protocol.

In an embodiment, the connector may be a credential signed by the configurator, and may be used by a enrollee client to connect to an enrollee AP. In an embodiment, the configurator may own, for example, a c-sign-key and a C-sign-key which are a signing key pair, the c-sign-key may be used by the configurator to sign connectors, and the C-sign-key may be used for provisioned DPP devices to verify connectors of other DPP devices which are signed by the same configurator.

A connector of each enrollee may include a public key, a network role, and group attribute information, and may be signed by a configurator. The public key may provide an ID of a corresponding enrollee. The network role may indicate whether the corresponding enrollee is an enrollee (an enrollee client or an enrollee STA) or an enrollee AP. The group attribute information may be used for detecting whether an enrollee may establish a network connection. A connector signature may prove that corresponding connector contents were generated by the configurator. A connector includes a public key rather than a password, so secure credential information may be different per Wi-Fi device, e.g., per enrollee. For example, another enrollee may not access a network using the corresponding connector, and a case that an enrollee corresponding to the corresponding connector belongs to a specific AP may refer, for example to another AP not impersonating the specific AP.

In an embodiment, the enrollee client may discover the enrollee AP based on network information. The enrollee client may perform an authentication operation based on a connector, and establish a network connection based on a network introduction (NI) protocol. An advantage of using the connector may be that each enrollee connected to an AP has unique secure credential information.

Figure 7:
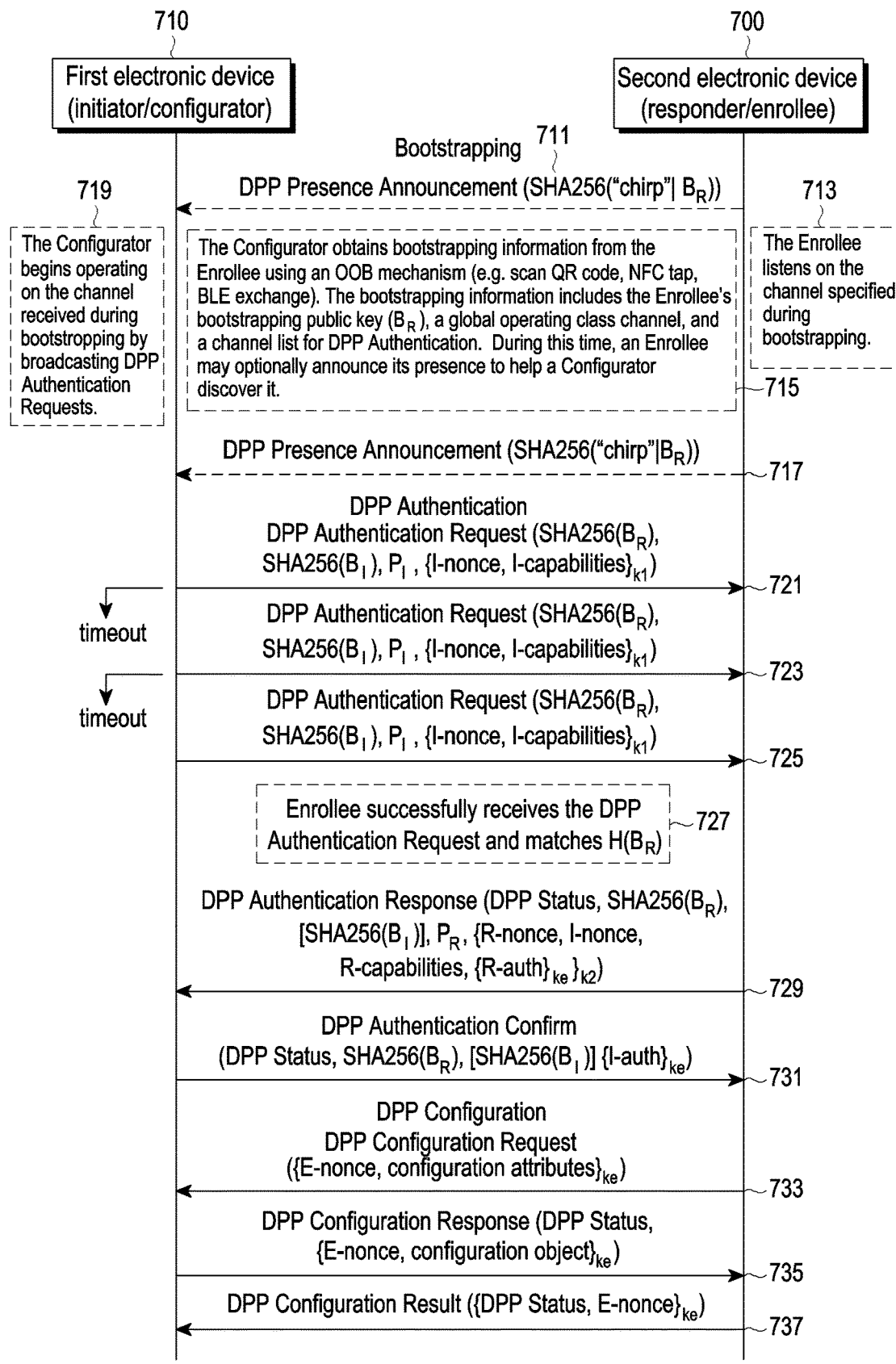
FIG. 7 is a signal flow diagram illustrating an example of a provisioning process in a DPP network according to various embodiments.

FIG. 7 is a signal flow diagram illustrating an example provisioning process in a DPP network according to various embodiments.

Referring to FIG. 7, each of an electronic device, for example, a first electronic device 710, and an external electronic device, for example, a second electronic device 700 may be a DPP device, and it will be assumed that the first electronic device 710 operates as both a configurator and an initiator, and the second electronic device 700 operates as both an enrollee and a responder.

In operation 711, the second electronic device 700 operating as both the enrollee and the responder may transmit a DPP presence announcement frame. In an embodiment, the DPP presence announcement frame may be used to signal, to the initiator which is the configurator, that the responder is ready to participate in DPP exchange, and may include a hash including a public bootstrapping key of a transmitter, e.g., the responder (e.g., the second electronic device 700). In an embodiment, the hash including the public bootstrapping key of the responder may be secure information used in a DPP bootstrapping operation. In an embodiment, a hash for the DPP presence announcement frame to prevent leakage of a hash of a public key of a unprovisioned device may be SHA256("chirp"|$B_R$). In an embodiment, $B_R$ may represent the public bootstrapping key of the responder, for example, the second electronic device 700.

In operation 713, the second electronic device 700 may perform a listening operation on a specified channel during the DPP bootstrapping operation. During the DPP bootstrapping operation, in operation 715, the first electronic device 710 which operates as both the configurator and the initiator may use an out-of-band (OOB) mechanism, for example, QR code scan, NFC tap, or BLE exchange to obtain bootstrapping information from the second electronic device 700. In an embodiment, the bootstrapping information may include the public bootstrapping key ($B_R$) of the second electronic device 700, a global operating class channel, and/or a channel list for DPP authentication. In operation 715, the second electronic device 700 may optionally announce presence of the second electronic device 700 to help the first electronic device 710 discover the second electronic device 700. In operation 717, the second electronic device 700 may transmit a DPP presence announcement frame. For example, the second electronic device 700 may periodically transmit a DPP presence announcement frame.

In operation 719, the first electronic device 710 may begin operating on a channel based on channel information received during bootstrapping by broadcasting DPP authentication request frames. For example, the first electronic device 710 may continuously broadcast DPP authentication request frames in operations 721, 723, and 725. In an embodiment, a DPP authentication request frame may include SHA256($B_R$), SHA256($B_I$), $P_I$, and {I-nonce, I-capabilities}$_{k1}$. For example, SHA256($B_R$) may represent a SHA256 hash for $B_R$, $B_I$ may represent a public bootstrapping key of the first electronic device 710, SHA256($B_I$) may represent a SHA256 hash for $B_I$, $P_I$ may represent a public protocol key of the electronic device 710, I-nonce may represent an initiator nonce attribute, I-capabilities may represent an initiator capabilities attribute, and k1 may represent a first intermediate key. In an embodiment, {I-nonce, I-capabilities}$_{k1}$ may represent I-nonce and I-capabilities which are encrypted with k1. In an embodiment, at least one of SHA256($B_R$), SHA256($B_I$), $P_I$, or {I-nonce, I capabilities}$_{k1}$ included in the DPP authentication request frame may be secure information used in a DPP authentication operation.

In operation 727, if the first electronic device 710 broadcasts the DPP authentication request frames and the second electronic device 700 successfully receives this DPP authentication request frame, the second electronic device 700 may match H($B_R$) which is a hash function value for $B_R$. In operation 729, the second electronic device 700 may transmit, to the first electronic device 710, a DPP authentication response frame which is a response frame to the DPP authentication request frame. In an embodiment, the DPP authentication response frame may include a DPP status field, SHA256($B_R$), [SHA256($B_I$)], $P_R$, and {R-nonce, I-nonce, R-capabilities, {R-auth}$_{ke}$}$_{k2}$. For example, $P_R$ may represent a public protocol key of the second electronic device 700, R-nonce may represent a responder nonce attribute, R-capabilities may represent a responder capabilities attribute, R-auth may represent an authentication tag of the responder, for example, the second electronic device 700, ke may represent an encryption key, k2 may represent a second intermediary key, and [ ] may represent a value optionally present. For example, [SHA256($B_I$)] may be optionally included in the DPP authentication response frame or may be included in the DPP authentication response frame if a specific condition is satisfied. In an embodiment, {R-auth}$_{ke}$ may represent R-auth encrypted with ke. In an embodiment, {R-nonce, I-nonce, R-capabilities, {R-auth}$_{ke}$}$_{k2}$ may represent R-nonce, I-nonce, R-capabilities, and {R-auth}$_{ke}$ which are encrypted with k2. In an embodiment, at least one of SHA256($B_R$), [SHA256($B_I$)], $P_R$, or {R-nonce, I-nonce, R-capabilities, {R-auth}$_{ke}$}$_{k2}$ included in the DPP authentication response frame may be secure information used in the DPP authentication operation.

The DPP status field may indicate a status as shown in Table 1 below.

TABLE 1

| Status or Error | Value | Meaning |
|---|---|---|
| STATUS_OK | 0 | No errors or abnormal behavior |
| STATUS_NOT_COMPATIBLE | 1 | The DPP Initiator and Responder have incompatible capabilities |

TABLE 1-continued

| Status or Error | Value | Meaning |
|---|---|---|
| STATUS_AUTH_FAILURE | 2 | Authentication failed |
| STATUS_BAD_CODE | 3 | The code used in PKEX is bad |
| STATUS_BAD_GROUP | 4 | An unsupported group was offered |
| STATUS_CONFIGURE_FAILURE | 5 | Configurator refused to configure Enrollee |
| STATUS_RESPONSE_PENDING | 6 | Responder will reply later |
| STATUS_INVALID_CONNECTOR | 7 | Received Connector is invalid for some reason. The sending device needs to be reconfigured. |
| STATUS_NO_MATCH | 8 | Received Connector is verified and valid but no matching Connector could be found. The receiving device needs to be reconfigured. |
| STATUS_CONFIG_REJECTED | 9 | Enrollee rejected the configuration. |
| STATUS_NO_AP | 10 | Enrollee failed to discover an access point. |
| STATUS_CONFIGURE_PENDING | 11 | Configuration response is not ready yet. The enrollee needs to request again. |
| STATUS_CSR_NEEDED | 12 | Configuration requires a Certificate Signing Request. The enrollee needs to request again. |
| STATUS_CSR_BAD | 13 | The Certificate Signing Request was invalid. |
| STATUS_NEW_KEY_NEEDED | 14 | The Enrollee needs to generate a new Protocol key. |

In operation 731, the first electronic device 710 receiving the DPP authentication response frame from the second electronic device 700 may transmit a DPP authentication confirm frame to the second electronic device 700. In an embodiment, the DPP authentication confirm frame may include a DPP status field, SHA256($B_R$), [SHA256($B_I$)], and {I-auth}$_{ke}$. In an embodiment, I-auth may represent an authenticating tag of the initiator, for example, the first electronic device 710, and ke may represent the encryption key. In an embodiment, {I-auth}$_{ke}$ may represent I-auth encrypted with ke.

In operation 733, the second electronic device 700 receiving the DPP authentication confirm frame from the first electronic device 710 may transmit a DPP configuration request frame to the first electronic device 710. In an embodiment, the DPP configuration request frame may include {E-nonce, configuration attributes}$_{ke}$. In an embodiment, E-nonce may represent an E-nonce attribute, and configuration attributes may represent configuration attribute objects. A configuration attribute object may include at least one of a device name attribute, a Wi-Fi technology attribute, or a network role attribute. In an embodiment, {E-nonce, configuration attributes}$_{ke}$ may represent E-nonce and configuration attributes which are encrypted with ke.

In operation 735, the first electronic device 710 receiving the DPP configuration request frame may transmit, to the second electronic device 700, a DPP configuration response frame which is a response to the DPP configuration request frame. In an embodiment, the DPP configuration response frame may include a DPP status field and {E-nonce, configuration object}$_{ke}$. In an embodiment, a configuration object may represent a DPP configuration object. In an embodiment, {E-nonce, configuration object}$_{ke}$ may represent an E-nonce and a configuration object which are encrypted with ke.

In operation 737, the second electronic device 700 receiving the DPP configuration response frame may transmit a DPP configuration result frame to the first electronic device 710. In an embodiment, the DPP configuration result frame may include {DPP Status, E-nonce}$_{ke}$. In an embodiment, {DPP Status, E-nonce}$_{ke}$ may represent a DPP Status and an E-nonce which are encrypted with ke.

In an embodiment, a network introduction protocol is used so that an enrollee client may be securely connected to an enrollee AP using a connector provided by a configurator, and a DPP access operation which is based on the network introduction protocol may be as follows.

(1) Each of enrollee clients and the enrollee AP may identify whether a connector of each of the enrollee clients and the enrollee AP is signed by the configurator.

(2) Each of the enrollee clients may identify that a role of each of the enrollee clients is compatible and establish a communication with the enrollee AP.

(3) The enrollee clients may identify whether group attributes are matched.

(4) Each of the enrollee AP and the enrollee clients may derive a pairwise master key (PMK) based on a public connector key.

(5) A connection may be established between the enrollee AP and the enrollee clients based on the derived PMK.

Figure 8:
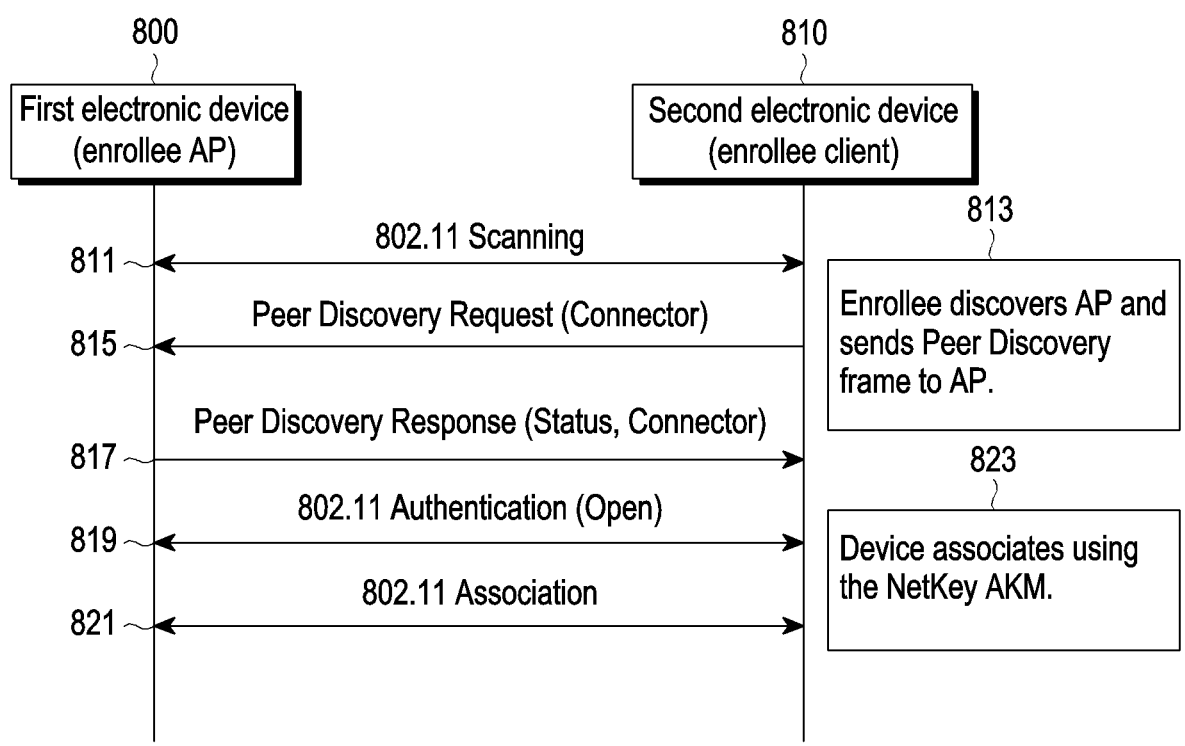
FIG. 8 is a signal flow diagram illustrating an example network access operation using a connector according to various embodiments.

FIG. 8 is a signal flow diagram illustrating an example network access operation using a connector according to various embodiments.

Referring to FIG. 8, each of an electronic device, for example, a first electronic device 800, and an external electronic device, for example, a second electronic device 810 may be a DPP device, and it will be assumed that the first electronic device 800 may operate as an enrollee AP, and the second electronic device 810 operates as an enrollee client.

In operation 811, the second electronic device 810 as the enrollee client may perform an IEEE 802.11 scanning operation which is based on an IEEE 802.11 standard. In operation 813, the second electronic device 810 may discover the first electronic device 800 which is the enrollee AP according to performance of an IEEE 802.11 scanning operation. In operation 815, the second electronic device 810 may transmit, to the discovered first electronic device 800, a peer discovery request frame including a connector attribute. In operation 817, the first electronic device 800 may receive the peer discovery request frame from the second electronic device 810, and transmit, to the second electronic device 810, a peer discovery response frame in response to the peer discovery request frame. In an embodiment, the peer discovery response frame may include a connector attribute and a state attribute, and the state attribute may indicate a DPP state attribute.

In operation 819, upon receiving the peer discovery response frame from the first electronic device 800, the second electronic device 810 may perform an IEEE 802.11 authentication operation which is based on the IEEE 802.11 standard with the first electronic device 800. In operation 821, the second electronic device 810 may perform, with the first electronic device 800, an IEEE 802.11 association operation which is based on the IEEE 802.11 standard. In operation 823, the second electronic device 810 may be associated with the first electronic device 800 using an authentication and key management (AKM) which is a network key.

A DPP connection status result according to various embodiments of the disclosure will be described in greater detail below.

According to an embodiment, if both an enrollee and a configurator use a DPP whose version is a specific protocol version which is greater than or equal to, for example, 2, and a DPP configuration operation between the configurator and the enrollee is successful, the configurator may request the enrollee to provide feedback on an attempt to use a configuration applied to a DPP configuration object received through the successful DPP configuration operation.

According to an embodiment, this feedback request may be used if the enrollee is an enrollee STA, and the configurator may receive the feedback on the attempt to use the configuration applied to the DPP configuration object which is received from the enrollee through the successful DPP configuration operation if the DPP configuration operation between the configurator and the enrollee by including a sendConnStatus attribute which is an attribute requesting to transmit connection status into a DPP configuration response frame.

In an embodiment, the enrollee receiving the DPP configuration response frame may discover an AP to which the enrollee will be connected based on a DPP configuration object included in the DPP configuration response frame, and may attempt to connect to the discovered AP. If the sendConnStatus attribute is included in the DPP configuration response frame, the enrollee may transmit, to the configurator, a DPP configuration result frame which confirms receipt of the DPP configuration object and status for a connection attempt to which the configurator applies the DPP configuration object.

In an embodiment, status for a connection attempt to which a DPP configuration object is applied may be indicated through a DPP connection status object, and DPP status values which may be included in the DPP connection status object are as shown in Table 2 below.

Table 2

TABLE 2

| Connection Attempt Result | DPP Status |
| --- | --- |
| Enrollee successfully associated to the AP and has network access | STATUS_OK |
| Enrollee discovered the AP and failed to connect to the network. | STATUS_AUTH_FAILURE |
| Enrollee received an invalid Connector during network introduction. | STATUS_INVALID_CONNECTOR |

TABLE 2-continued

| Connection Attempt Result | DPP Status |
| --- | --- |
| Received AP Connector is verified and valid but no matching Connector could be found by Enrollee. | STATUS_NO_MATCH |
| Enrollee failed to discover an access point. | STATUS_NO_AP |

In Table 2, if an enrollee is successfully associated with an AP and has a network access, a DPP status value may be set to "STATUS_OK". In Table 2, if the enrollee discovers the AP but fails to connect to a network, the DPP status value may be set to "STATUS_AUTH_FAILURE". In Table 2, the DPP status value may be set to "STATUS_INVALID_CONNECTOR" if the enrollee receives an invalid connector during network introduction. In Table 2, if a received AP connector is verified and valid, but no matching connector is detected by the enrollee, the DPP status value may be set to "STATUS_NO_MATCH". In Table 2, if the enrollee fails to discover the AP, the DPP status value may be set to "STATUS_NO_AP".

A configurator delegation operation according to various embodiments of the disclosure will be described.

In a DPP network, it may be required to make use of multiple configurators for provisioning. In an embodiment, an already activated configurator, e.g., an existing configurator may delegate authority to a new configurator to share network management and provide backup for a configurator function. An operation in which the already activated configurator delegates the authority to the new configurator may be referred to as "configurator delegation operation". In an embodiment, "configurator delegation operation" may refer, for example, to an operation in which a first configurator (hereinafter, referred to as "first configurator") which is the already activated configurator provides, to a second configurator (hereinafter, referred to as "second configurator") which is the new configurator, network configuration information, e.g., a DPP configuration object, which the first configurator manages. In an embodiment, the configurator delegation operation may be included in a network management operation provided by the configurator.

In an embodiment, the network configuration information provided from the first configurator to the second configurator through the configurator delegation operation may be enveloped network configuration information, and the enveloped network configuration information may include network configuration information managed by the first configurator, e.g., encrypted network configuration information which is generated by encrypting a DPP configuration object based on a set encryption scheme and information about the encryption scheme. In an embodiment, the encryption scheme may be a scheme which is based on an encryption key. In an embodiment, the enveloped network configuration information may be referred to as "DPPEnvelopedData". In an embodiment, the operation of delegating the authority to the new configurator, for example, the configurator delegation operation may be performed through a DPP configuration backup and restore process.

Figure 9:
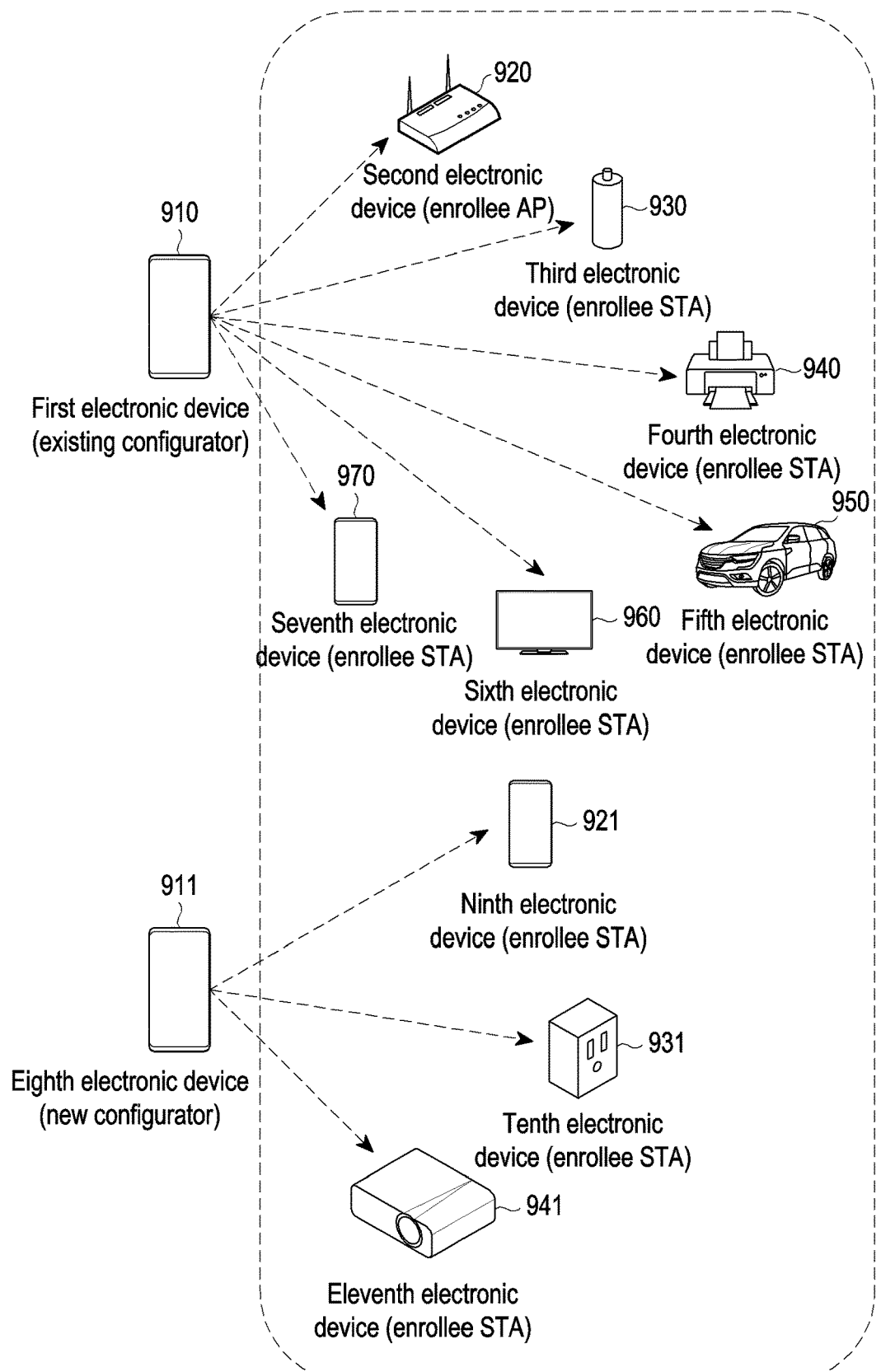
FIG. 9 is a diagram illustrating an example configurator delegation operation in a DPP network according to various embodiments.

FIG. 9 is a diagram illustrating an example configurator delegation operation in a DPP network according to various embodiments.

Referring to FIG. 9, if it is required to make use of a plurality of configurators for provisioning, an already activated configurator may delegate authority to a new configurator to share network management and provide backup for a configurator function. In an embodiment, a DPP network may include a plurality of electronic devices, for example, an electronic device (e.g., a first electronic device 910) and external electronic devices (e.g., a second electronic device 920, a third electronic device 930, a fourth electronic device 940, a fifth electronic device 950, a sixth electronic device 960, a seventh electronic device 970, an eighth electronic device 911, a ninth electronic device 921, a tenth electronic device 931, or an eleventh electronic device 941).

In FIG. 9, the first electronic device 910 may operate as a configurator, the second electronic device 920 may operate as an enrollee AP, and each of the third electronic device 930, the fourth electronic device 940, the fifth electronic device 950, the sixth electronic device 960, and the seventh electronic device 970 may operate as an enrollee STA. In an embodiment, the first electronic device 910 may be an already activated configurator.

In an embodiment, if it is required to make use of the plurality of configurators for the provisioning, the first electronic device 910 which is the already activated configurator may select the eighth electronic device 911 as a new configurator to be activated, and delegate authority to the eighth electronic device 911 which is the new configurator so that the eighth electronic device 911 may share network management and receive a backup for a configurator function. In an embodiment, the already activated constructor may select the new configurator be activated based on various scheme, this will be described in greater detail below, so a detailed description thereof may not be provided here.

The eighth electronic device 911 which is the new configurator may receive enveloped network configuration information from the first electronic device 910 which is the already activated configurator. In an embodiment, the enveloped network configuration information may include network configuration information managed by the first configurator 910, e.g., encrypted network configuration information which is generated by encrypting a DPP configuration object based on a set encryption scheme and information about the encryption scheme. The eighth electronic device 911 may operate as the configurator based on the enveloped network configuration information received from the first electronic device 910. The eighth electronic device 911 may operate as the configurator, and each of the ninth electronic device 921, the tenth electronic device 931, and the eleventh electronic device 941 may operate as an enrollee connected to the eighth electronic device 911.

An operation, for example, a configurator delegation operation, for configuring a plurality of configurators according to various embodiments of the disclosure will be described in greater detail below.

In an embodiment, if it is required to make use of a plurality of configurators for provisioning in a DPP network, the plurality of configurators may be configured in a way of sharing a key pair (sign and verification) for sharing network configuration information. In an embodiment, the key pair (sign and verification) for sharing the network configuration information may be a configurator signing key. The configurator signing key may be generated by a configurator and may be used to sign connector credentials. In an embodiment, the configurator sign key may be a sign key pair, and the sign key pair may include a c-sign-key and a C-sign-key. The c-sign-key may be used by the configurator to sign connectors, and the C-sign-key may be used for provisioned DPP devices to verify connectors of other DPP devices signed by the same configurator.

An operation for activating a configurator, e.g., a configurator delegation operation according to various embodiments of the disclosure will be described in greater detail below.

In an embodiment, a configurator may be activated through a DPP configuration backup and restore process. An already activated configurator, e.g., a first configurator may encrypt network configuration information, e.g., DPP configuration information (e.g., a DPP configuration object) based on a set encryption scheme to generate encrypted DPP configuration information, and generate DPPEnvelopedData including the encrypted DPP configuration information and the encryption scheme. In an embodiment, the encryption scheme may be a scheme which is based on an encryption key.

The first configurator may transmit the generated DPPEnvelopedData to a new configurator, e.g., a second configurator, and the second configurator may decrypt the received DPPEnvelopedData based on a decryption scheme which corresponds to the encryption scheme applied by the first configurator to store the DPP configuration information managed by the first configurator, thereby the second configurator may be activated. In an embodiment, the new configurator may be selected based on various schemes, and for example, information about an enrollee, e.g., a DPP device, to be activated as the new configurator is input through an UI of the first configurator, and the new configurator may be selected based on the input information.

In an embodiment, the first configurator which is the existing configurator may output information about at least one enrollee which may be activated as the new configurator, e.g., at least one DPP device through a UI. In an embodiment, the first configurator may display information about an enrollee in a form of a map. In an embodiment, an enrollee which may be activated as the new configurator may be an enrollee which exists within a threshold distance from the first configurator. In an embodiment, the threshold distance may be variably determined according to a situation of the DPP network. In an embodiment, the enrollee which may be activated as the new configurator may be an enrollee whose information is stored in the first configurator. In an embodiment, the enrollee which may be activated as the new configurator may be an enrollee which has performed a DPP bootstrapping operation with the first configurator.

In an embodiment, a configurator may be activated through a DPP configuration operation. If a DPP device operating as an enrollee is selected as a new configurator, e.g., a second configurator, the enrollee may transmit, to an already activated configurator, e.g., a first configurator, a DPP configuration request frame in which a netRole parameter indicating a network role (netRole) to be provisioned is set to "configurator" indicating a configurator. In an embodiment, the new configurator may be selected based on various schemes, and for example, information selected so that the enrollee is activated as the new configurator is input through a UI of the enrollee, and the enrollee may identify that the enrollee will be activated as the new configurator based on the input information.

In an embodiment, a network role in a DPP network may include an STA, an AP, and a configurator, and a netRole parameter included in a DPP configuration request frame may indicate how an enrollee operates in the DPP network. For example, if the netRole parameter included in the DPP configuration request frame is set to "configurator", it may indicate that the enrollee wants to operate as a configurator.

Upon receiving the DPP configuration request frame in which the netRole parameter is set to "configurator", the first configurator may encrypt network configuration information, e.g., a DPP configuration object, which is managed by the first configurator based on a set encryption scheme to generate encrypted DPP configuration object, and generate DPPEnvelopedData including the encrypted DPP configuration object and the encryption scheme. In an embodiment, the encryption scheme may be a scheme which is based on an encryption key. The first configurator may include the DPPEnvelopedData into a payload of a DPP configuration response frame which is a response frame to the DPP configuration request frame, and transmit, to the enrollee, the DPP configuration response frame including the DPPEnvelopedData. In an embodiment, the DPP configuration object may be the network configuration information, and may include at least one of a Wi-Fi description object, a DPP discovery object, or a credential object. The DPP discovery object may include, for example, operating or discovery information such as an SSID, an operating channel, or an operating band.

Figure 10:
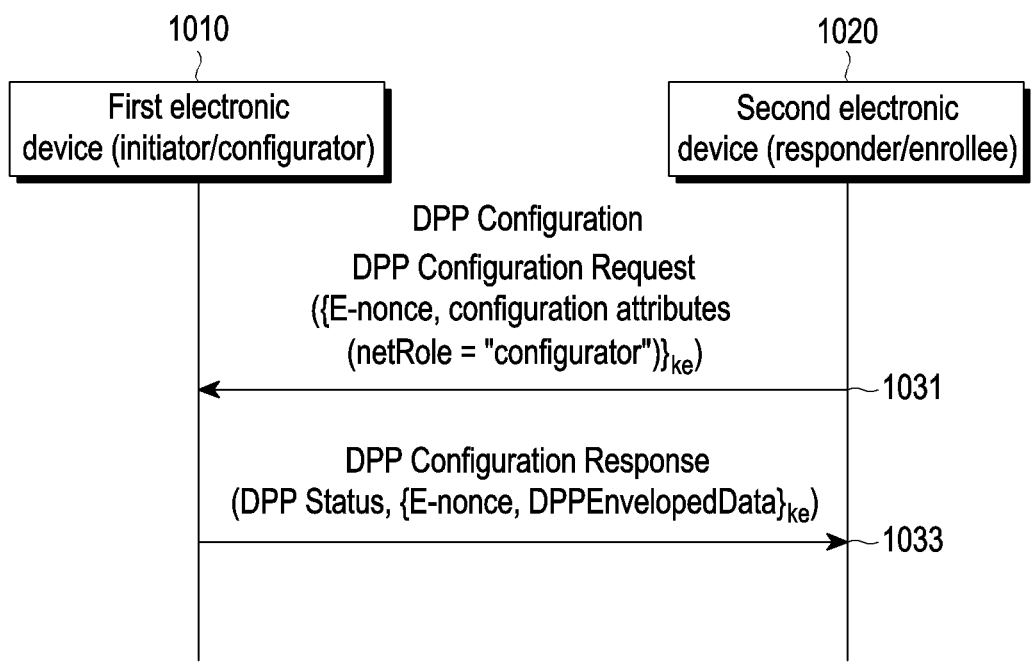
FIG. 10 is a signal flow diagram illustrating an example of a configurator delegation operation in a DPP network according to various embodiments.

FIG. 10 is a signal flow diagram illustrating an example configurator delegation operation in a DPP network according to various embodiments.

Referring to FIG. 10, each of an electronic device (e.g., an electronic device 101 in FIG. 1), e.g., a first electronic device 1010, and an external electronic device (e.g., an electronic device 102 in FIG. 1), e.g., a second electronic device 1020 may be a DPP device, and it will be assumed that the first electronic device 1010 operates as both a configurator and an initiator, and the second electronic device 1020 operates as both an enrollee and a responder. In an embodiment, it will be assumed that the second electronic device 1020 is a DPP device to be activated as a new configurator.

An operation of activating a configurator illustrated in FIG. 10 may be an operation after a DPP bootstrapping operation and a DPP authentication operation between the first electronic device 1010 and the second electronic device 1020 have been completed. As the DPP authentication operation has been completed between the first electronic device 1010 and the second electronic device 1020, in operation 1031, the second electronic device 1020 may transmit a DPP configuration request frame to the first electronic device 1010. In an embodiment, the DPP configuration request frame may include {E-nonce, configuration attributes(netRole="configurator")}$_{ke}$. In an embodiment, E-nonce may represent an E-nonce attribute, and configuration attributes may represent configuration attribute objects. A configuration attribute object may include at least one of a device name attribute, a Wi-Fi technology attribute, or a network role attribute. The second electronic device 1020 is an enrollee to be activated as the new configurator, so netRole which is a network role attribute included in the configuration attributes included in the DPP configuration request frame may be set to "configurator" (netRole="configurator"). In an embodiment, {E-nonce, configuration attributes(netRole="configurator")}$_{ke}$ may represent E-nonce and configuration attributes which are encrypted with ke.

The netRole included in the DPP configuration request frame is set to "configurator", so the first electronic device 1010 which receives the DPP configuration request frame may identify that the second electronic device 1020 wants to operate as the new configurator in operation 1033. Accordingly, the first electronic device 1010 may encrypt network configuration information, e.g., a DPP configuration object, which is managed by the first electronic device 1010 based on a set encryption scheme to generate encrypted DPP configuration information, and generate DPPEnvelopedData including the encrypted DPP configuration information and the encryption scheme. In an embodiment, the encryption scheme may be a scheme based on an encryption key. The first electronic device 1010 may include DPPEnvelopedData into a payload of a DPP configuration response frame which is a response frame to the DPP configuration request frame, and transmit, to an enrollee, the DPP configuration response frame including the payload in which DPPEnvelopedData is included. In an embodiment, the DPP configuration response frame may include a DPP status field and {E-nonce, DPPEnvelopedData}$_{ke}$. In an embodiment, {E-nonce, DPPEnvelopedData}$_{ke}$ may represent E-nonce and DPPEnvelopedData which are encrypted with ke.

According to an embodiment, in a DPP network, a plurality of configurators may be configured based on a DPP configuration operation, for this, an operation of transmitting, from an enrollee to be activated as a new configurator to a configurator, a DPP configuration request frame in which a network role of the enrollee is set to a configurator, for example, a DPP configuration request frame in which a netRole parameter is set to "configurator" may be essential. However, this operation may be performed if the enrollee to be activated as the new configurator is a DPP device which may operate as only a configurator, or a DPP device which may also operate as an AP or an STA and know a situation in which it needs to operate as the configurator.

Even though an already activated configurator initiates a DPP authentication operation in order to activate an enrollee as a new configurator, and thus a DPP configuration operation between the already activated configurator and the enrollee is performed, it may not be guaranteed for the enrollee to transmit a DPP configuration request frame in which a network role of the enrollee is set to a configurator, for example, a DPP configuration request frame in which a netRole parameter is set to "configurator". This may be because the network role of the enrollee in a DPP network is generally set to an AP or an STA connected to the AP. Accordingly, it may be difficult for a DPP device operating as an enrollee to request a network role as a configurator without separate manipulation or setting.

In various embodiments of the disclosure, a network management operation may be performed by a configurator. In an embodiment, the network management operation may include an operation of enrolling and provisioning devices for a D2D communication or an infrastructure communication, and a configurator delegation operation. In an embodiment, the configurator delegation operation may include an operation in which the configurator delegates management of the configurator, e.g., network management of the configurator to another configurator, e.g., a new configurator in order to share the management and provide backup of capabilities, e.g., network configuration information (e.g., a DPP configuration object), of the configurator.

Figure 11A:
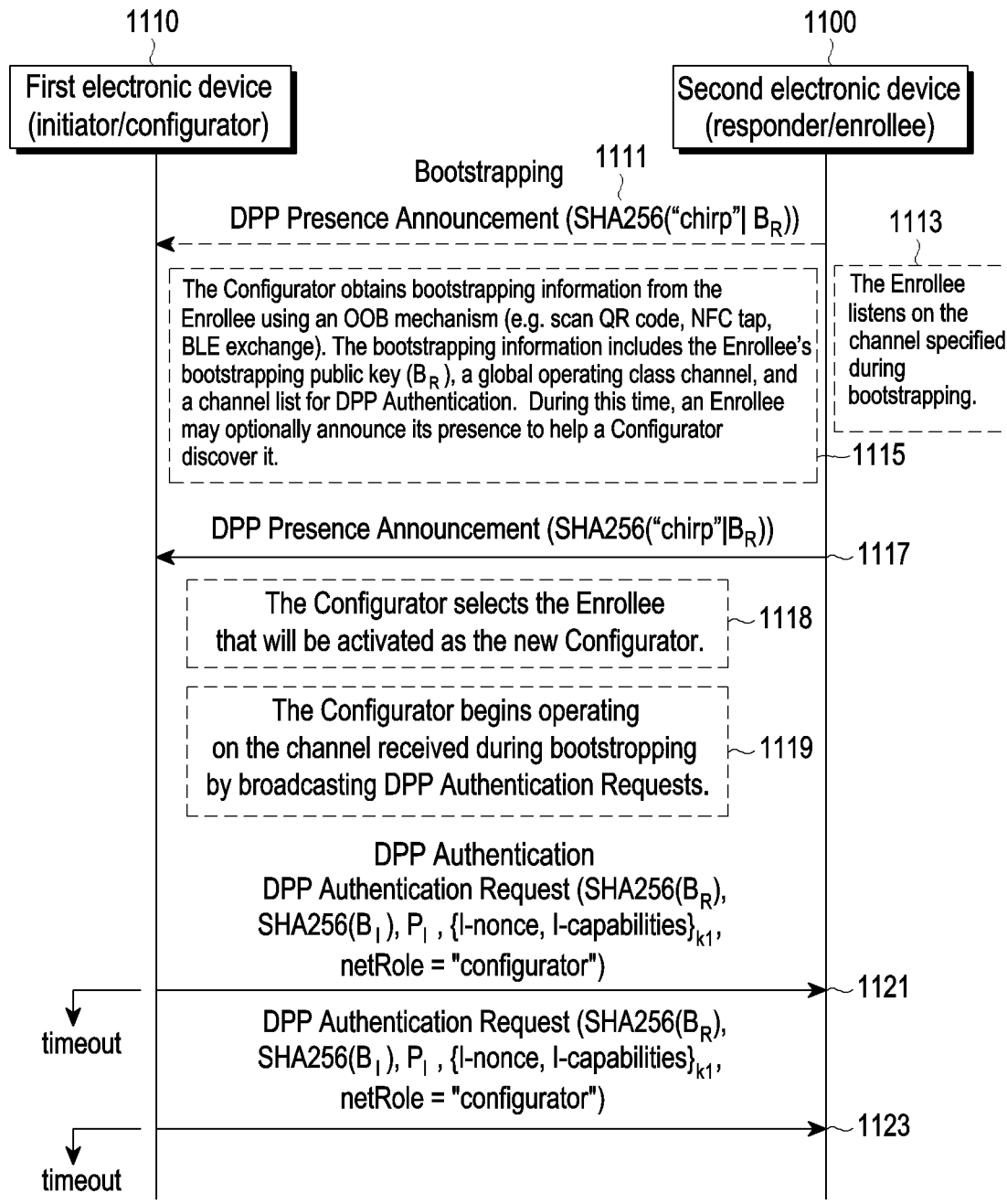
FIGS. 11A and 11B are signal flow diagrams illustrating an example of a configurator delegation operation in a DPP network according to various embodiments.
Figure 11B:
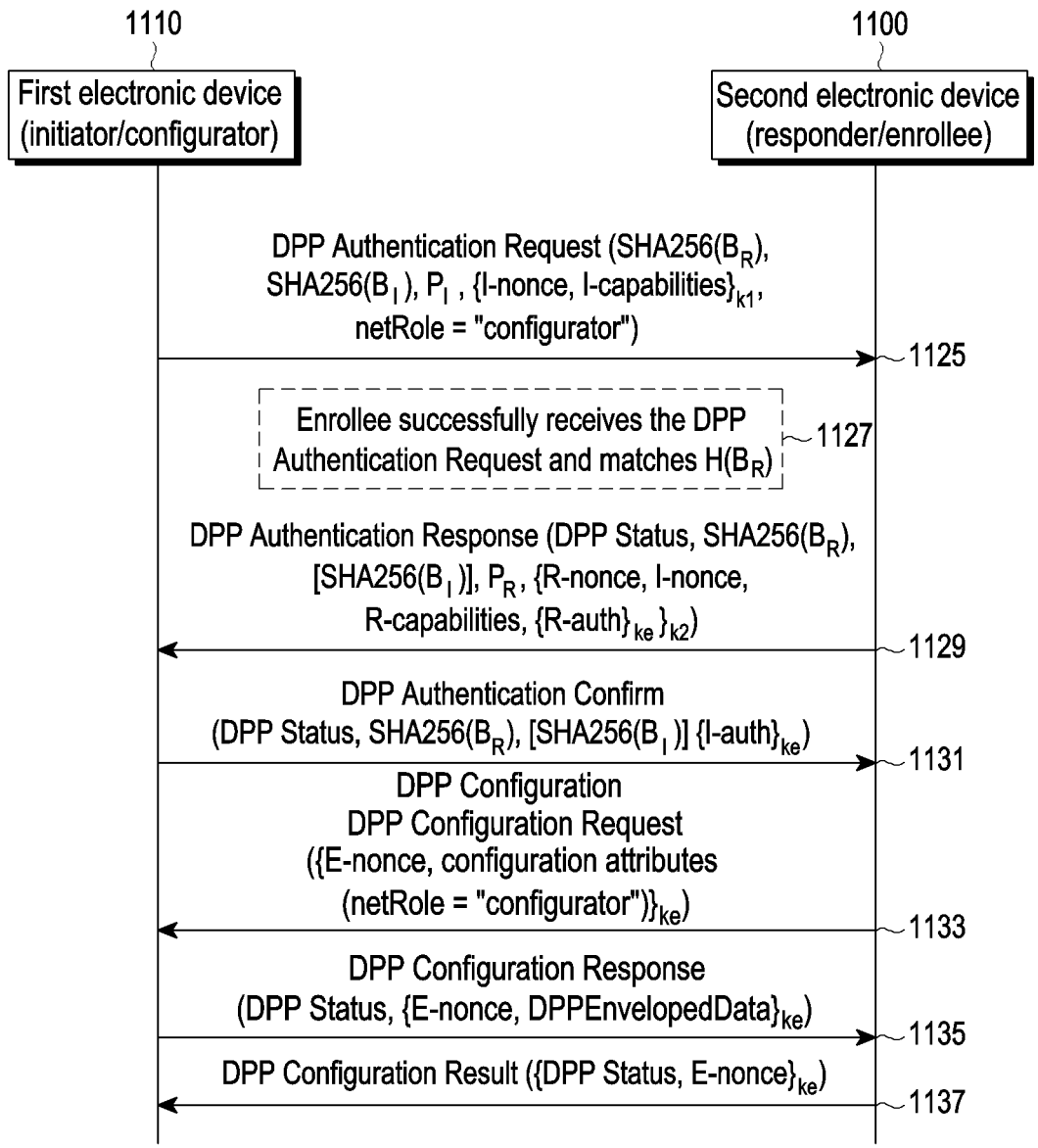

FIGS. 11A and 11B are signal flow diagrams illustrating an example configurator delegation operation in a DPP network according to various embodiments.

Referring to FIGS. 11A and 11B, each of an electronic device (e.g., an electronic device 101 in FIG. 1), for example, a first electronic device 1110, and an external electronic device (e.g., an electronic device 102 or an electronic device 104 in FIG. 1), for example, a second electronic device 1100 may be a DPP device, and it will be assumed that the first electronic device 1110 operates as both a configurator and an initiator, and the second electronic device 1100 operates as both an enrollee and a responder. In an embodiment, it will be assumed that the second electronic device 1100 is a DPP device to be activated as a new configurator.

In operation 1111, the second electronic device 1100 operating as both the enrollee and the responder may transmit a DPP presence announcement frame. In an embodiment, the DPP presence announcement frame may be used to signal, to the initiator which is the configurator, that the responder is ready to participate in DPP exchange, and may include DPP bootstrapping information. In an embodiment, the DPP bootstrapping information may include a hash including a public bootstrapping key of a transmitter, e.g., the responder (e.g., the second electronic device 1100). In an embodiment, the hash including the public bootstrapping key of the responder may be secure information used in a DPP bootstrapping operation. In an embodiment, a hash for the DPP presence announcement frame to prevent leakage of a hash of a public key of a unprovisioned device may be SHA256("chirp"|$B_R$). In an embodiment, $B_R$ may represent a public bootstrapping key of the responder, for example, the second electronic device 1100.

In operation 1113, the second electronic device 1100 may perform a listening operation on a specified channel during the DPP bootstrapping operation. During the DPP bootstrapping operation, in operation 1115, the first electronic device 1110 which operates as both the configurator and the initiator may use an OOB mechanism, for example, QR code scan, NFC tap, or BLE exchange to obtain DPP bootstrapping information from the second electronic device 1100. In an embodiment, the DPP bootstrapping information may include a public bootstrapping key ($B_R$) of the second electronic device 1100, a global operating class channel, and/or a channel list for DPP authentication.

In operation 1115, the second electronic device 1100 may optionally announce presence of the second electronic device 1100 to help the first electronic device 1110 discover the second electronic device 1100. In operation 1117, the second electronic device 1100 may transmit a DPP presence announcement frame. For example, the second electronic device 1100 may periodically transmit the DPP presence announcement frame.

Through the above DPP bootstrapping operation, the first electronic device 1110 operating as the configurator may select an enrollee, e.g., the second electronic device 1100, which will operate as the new configurator in operation 1118. In an embodiment, the DPP bootstrapping operation may be performed between a configurator and a plurality of enrollees, and, for convenience of a description, a DPP bootstrapping operation between one enrollee, e.g., the second electronic device 1100, and a configurator, e.g., the first electronic device 1110 is described in FIGS. 11A and 11B.

In an embodiment, the first electronic device 1110 may select the second electronic device 1100 from among the plurality of enrollees as the enrollee to be activated as the new configurator. In an embodiment, information about the enrollee to be activated as the new configurator, e.g., the second electronic device 1100 may be input to the first electronic device 1110 through a UI, and the first electronic device 1110 may select the second electronic device 1100 as the enrollee to be activated as the new configurator. In an embodiment, the first electronic device 1110 which is the existing configurator may output information about at least one enrollee which may be activated as the new configurator, e.g., at least one DPP device through a UI. In an embodiment, the first electronic device 1110 may display information about an enrollee in a form of a map. In an embodiment, an enrollee which may be activated as the new configurator may be an enrollee which exists within a threshold distance from the first electronic device 1110. In an embodiment, the threshold distance may be variably determined according to a situation of the DPP network. In an embodiment, the enrollee which may be activated as the new configurator may be an enrollee whose information is stored in the first electronic device 1110. In an embodiment, the enrollee which may be activated as the new configurator may be an enrollee which has performed a DPP bootstrapping operation with the first electronic device 1110.

In operation 1119, the first electronic device 1110 may begin operating on a channel based on channel information received during bootstrapping by broadcasting DPP authentication request frames. For example, the first electronic device 1110 may continuously broadcast DPP authentication request frames in operations 1121, 1123, and 1125.

In an embodiment, the first electronic device 1110 may include network role information indicating a network role for the second electronic device 1100 into a DPP authentication request frame in order to activate the second electronic device 1100 as the new configurator, for example, in order to delegate network management of the first electronic device 1110 to the second electronic device 1100. In an embodiment, the network role information may be included in the DPP presence announcement frame in a format of vendor specific information element (VSIE). In an embodiment, the network role information may be implemented through a netRole parameter. In an embodiment, if a parameter value of the netRole parameter is set to "configurator", it may indicate that a network role is a configurator, if the parameter value of the netRole parameter is set to "AP", it may indicate that the network role is an AP, and if the parameter value of the netRole parameter is set to "STA", it may indicate that the network role is an STA. In FIGS. 11A and 11B, the first electronic device 1110 performs a configurator delegation operation for activating the second electronic device 1100 as the new configurator, so the parameter value of the netRole parameter included in the DPP authentication request frame may be set to "configurator". In an embodiment, the DPP authentication request frame may be implemented as a DPP public action frame, so the network role information may be included in the DPP authentication request frame in the format of VSIE.

In an embodiment, a DPP authentication request frame may include SHA256($B_R$), SHA256($B_I$), $P_I$, {I-nonce, I-capabilities}$_{k1}$, and netRole="configurator". For example, SHA256($B_R$) may represent a SHA256 hash for $B_R$, $B_I$ may represent a public bootstrapping key of the first electronic device 1110, SHA256($B_I$) may represent a SHA256 hash for $B_I$, $P_I$ may represent a public protocol key of the first electronic device 1110, I-nonce may represent an initiator nonce attribute, I-capabilities may represent an initiator capabilities attribute, k1 may represent a first intermediate key, and netRole may represent a network role for the second electronic device 1100. In an embodiment, {I-nonce, I-capabilities}$_{k1}$ may represent I-nonce and I-capabilities which are encrypted with k1. In an embodiment, at least one of SHA256($B_R$), SHA256($B_I$), $P_I$, or {I-nonce, I-capabilities}$_{k1}$ included in the DPP authentication request frame may be secure information used in a DPP authentication operation.

In operation 1127, if the first electronic device 1110 broadcasts the DPP authentication request frames and the second electronic device 1100 successfully receives this DPP authentication request frame, the second electronic device 1100 may match H($B_R$) which is a hash function value for $B_R$. In operation 1129, the second electronic device 1100 may transmit, to the first electronic device 1110, a DPP authentication response frame which is a response frame to the DPP authentication request frame. In an embodiment, the DPP authentication response frame may include a DPP status field, SHA256($B_R$), [SHA256($B_I$)], $P_R$, and {R-nonce, I-nonce, R-capabilities, {R-auth}$_{ke}$}$_{k2}$. For example, $P_R$ represents a public protocol key of the second electronic device 1100, R-nonce represents a responder nonce attribute, R-capabilities represents a responder capabilities attribute, R-auth represents an authentication tag of the responder, for example, the second electronic device 1100, ke represents an encryption key, k2 may represent a second intermediary key, and [ ] represents a value optionally present. For example, [SHA256($B_I$)] may be optionally included in the DPP authentication response frame or may be included in the DPP authentication response frame if a specific condition is satisfied. In an embodiment, {R-auth}$_{ke}$ may represent R-auth encrypted with ke. In an embodiment, {R-nonce, I-nonce, R-capabilities, {R-auth}$_{ke}$}$_{k2}$ may represent R-nonce, I-nonce, R-capabilities, and {R-auth}$_{ke}$ which are encrypted with k2. In an embodiment, at least one of SHA256($B_R$), [SHA256($B_I$)], $P_R$, or {R-nonce, I-nonce, R-capabilities, {R-auth}$_{ke}$}$_{k2}$ included in the DPP authentication response frame may be secure information used in the DPP authentication operation. The DPP status field has been described in Table 1, so a description of the DPP status field may not be repeated here.

In operation 1131, the first electronic device 1110 receiving the DPP authentication response frame from the second electronic device 1100 may transmit a DPP authentication confirm frame to the second electronic device 1100. In an embodiment, the DPP authentication confirmation frame may include a DPP status field, SHA256($B_R$), [SHA256 ($B_I$)], and {I-auth}$_{ke}$. In an embodiment, I-auth may represent an authenticating tag of the initiator, for example, the first electronic device 1110, and ke may represent the encryption key. In an embodiment, {I-auth}$_{ke}$ may represent I-auth encrypted with ke. In an embodiment, operation 1131 may be omitted if necessary.

In operation 1133, the second electronic device 1100 receiving the DPP authentication confirm frame from the first electronic device 1110 may transmit a DPP configuration request frame to the first electronic device 1110. In an embodiment, the second electronic device 1100 has received the netRole parameter through the DPP authentication request frame in the DPP authentication operation, so the second electronic device 1100 may identify that the second electronic device 1100 is requested to operate as the configurator based on the netRole parameter. In an embodiment, as the second electronic device 1100 identifies that the second electronic device 1100 is requested to operate as the configurator, the second electronic device 1100 may include network role information, e.g., network role information indicating a configurator into a DPP configuration request frame. The second electronic device 1100 may determine whether the second electronic device 1100 may operate as the configurator based on a capability of the second electronic device 1100. If the second electronic device 1100 is capable of operating as the configurator, the second electronic device 1100 may include network role information into the DPP configuration request frame.

In an embodiment, based on the request from the first electronic device 1110 to operate as the configurator, the second electronic device 1000 capable of operating as the configurator may include network role information, for example, network role information indicating a configurator into a DPP configuration request frame. In an embodiment, the second electronic device 1000 may include the network role information indicating the configurator in the DPP configuration request frame based on identifying that the second electronic device 1000 is selected to operate as the configurator. In an embodiment, the network role information may be implemented through a netRole parameter, and if a parameter value of the netRole parameter is set to "configurator", it may indicate that the network role is the configurator. In an embodiment, the DPP configuration request frame may include {E-nonce, configuration attributes(netRole="configurator")}$_{ke}$. In an embodiment, E-nonce may represent an E-nonce attribute, and configuration attributes may represent configuration attribute objects. A configuration attribute object may include at least one of a device name attribute, a Wi-Fi technology attribute, or a network role attribute. In an embodiment, {E-nonce, configuration attributes (netRole="configurator")}$_{ke}$ may represent E-nonce and configuration attributes (netRole="configurator") which are encrypted with ke. In operation 1135, the first electronic device 1110 receiving the DPP configuration request frame may identify that the second electronic device 1100 may operate as the configurator based on the netRole parameter included in the DPP configuration request frame. In an embodiment, the first electronic device 1110 may encrypt network configuration information, for example, a DPP configuration object, which is managed by the first electronic device 1110 based on a set encryption scheme to generate encrypted DPP configuration information, and generate DPPEnvelopedData including the encrypted DPP configuration information and the encryption scheme. In an embodiment, the encryption scheme may be a scheme based on an encryption key. The first electronic device 1110 may include the DPPEnvelopedData into a payload of a DPP configuration response frame which is a response frame to the DPP configuration request frame, and transmit the DPP configuration response frame including the DPPEnvelopedData to the second electronic device 1100. In an embodiment, the DPP configuration object may be network configuration information, and may include at least one of a Wi-Fi technology object, a DPP discovery object, or a credential object, and the DPP discovery object may include, for example, operating or discovery information such as an SSID, an operating channel, or an operating band. In an embodiment, the DPP configuration response frame may include a DPP status field and {E-nonce, DPPEnvelopedData}$_{ke}$. In an embodiment, {E-nonce, DPPEnvelopedData}$_{ke}$ may represent E-nonce and DPPEnvelopedData which are encrypted with ke.

Upon receiving the DPP configuration response frame, the second electronic device 1100 may use the network configuration information managed by the first electronic device 1110 based on the DPPEnvelopedData included in the DPP configuration response frame, so the second electronic device 1100 may operate as the new configurator. In operation 1137, the second electronic device 1100 receiving the DPP configuration response frame may transmit a DPP configuration result frame to the first electronic device 1110. In an embodiment, the DPP configuration result frame may include {DPP Status, E-nonce}$_{ke}$. In an embodiment, {DPP Status, E-nonce}$_{ke}$ may represent DPP Status and E-nonce which are encrypted with ke.

Figure 12A:
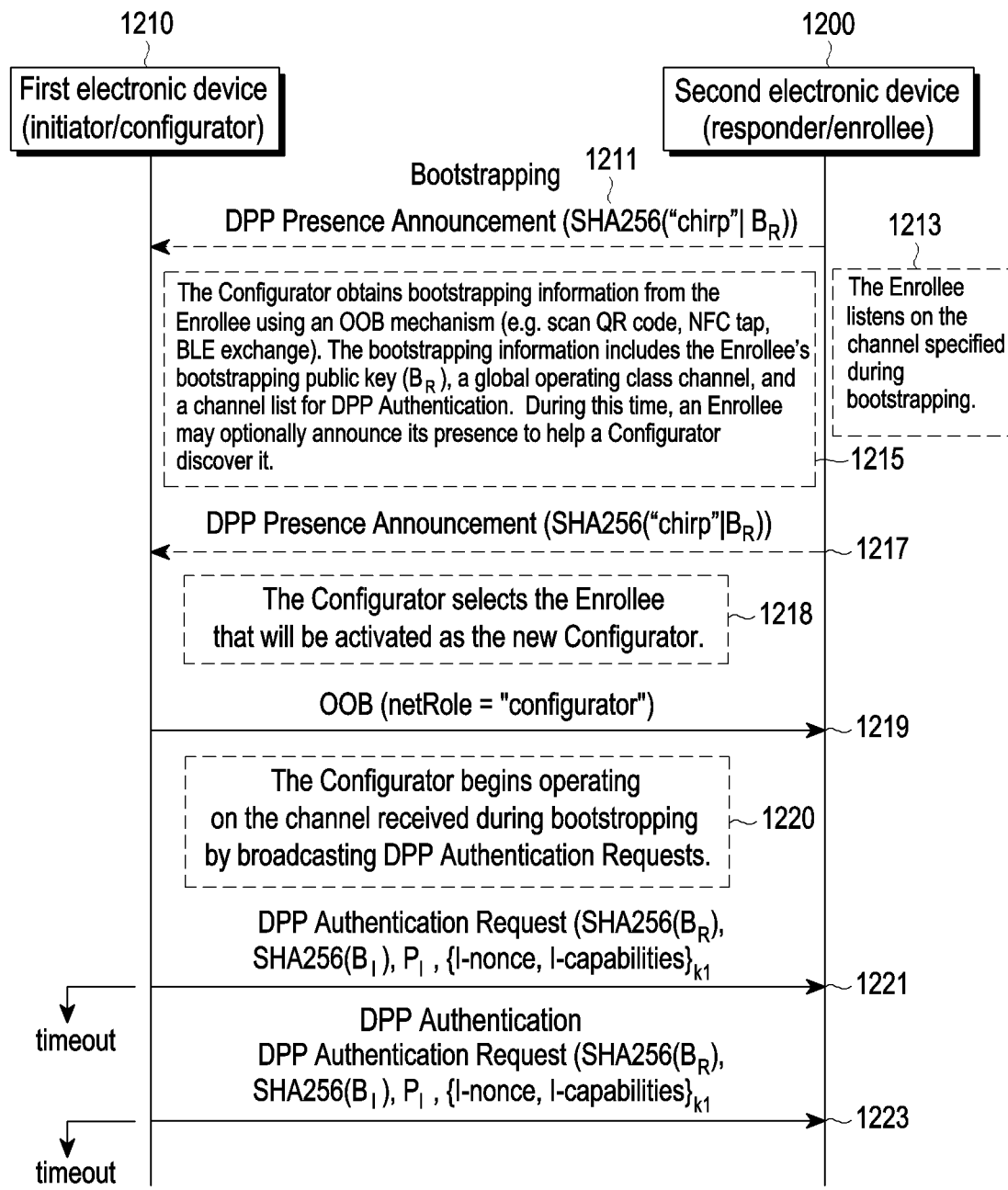
FIGS. 12A and 12B are signal flow diagrams illustrating an example of a configurator delegation operation in a DPP network according to various embodiments.
Figure 12B:
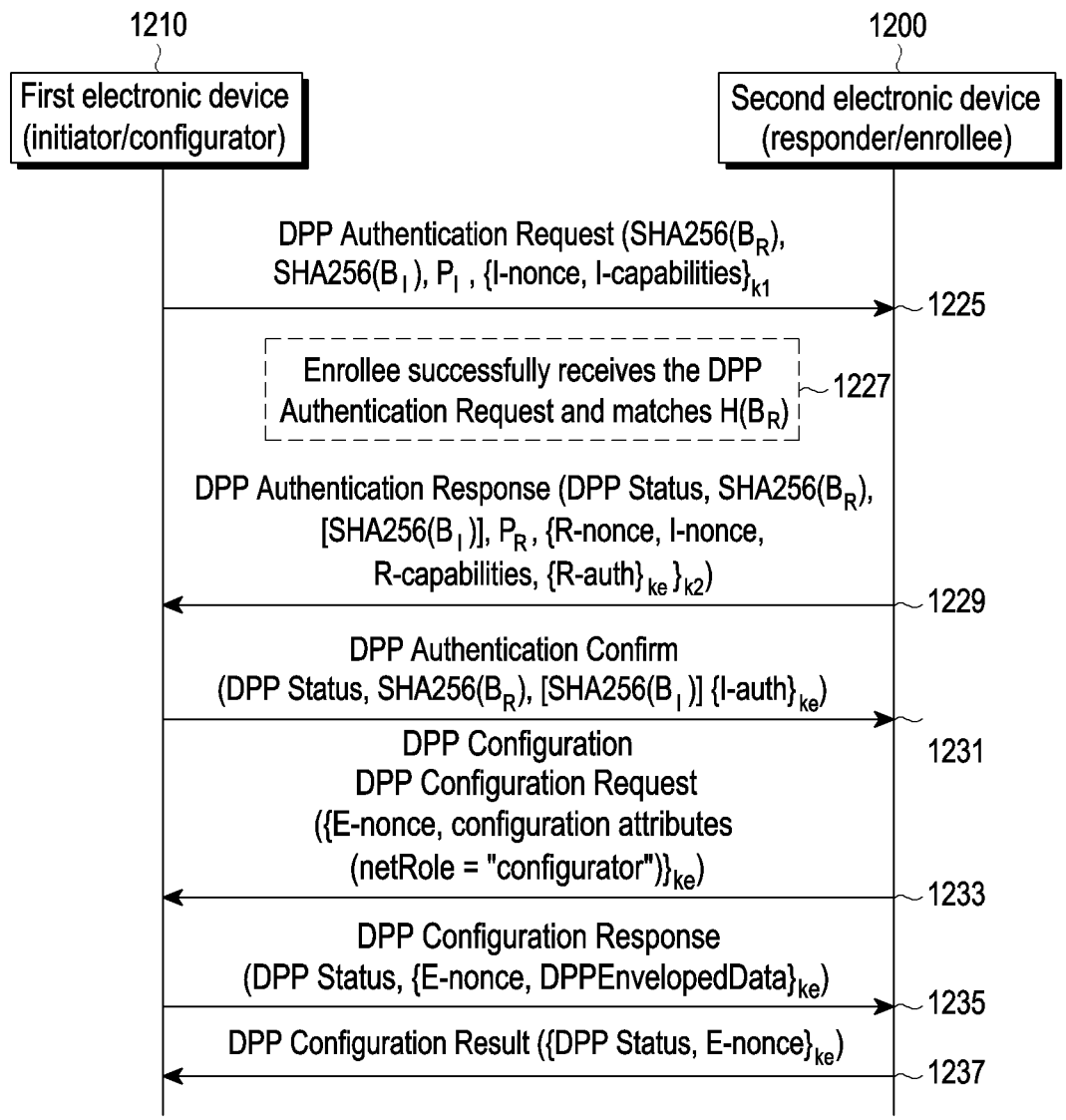

FIGS. 12A and 12B are signal flow diagrams illustrating an example configurator delegation operation in a DPP network according to various embodiments.

Referring to FIGS. 12A and 12B, each of an electronic device (e.g., an electronic device 101 in FIG. 1), for example, a first electronic device 1210, and an external electronic device (e.g., an electronic device 102 or an electronic device 104 in FIG. 1), for example, a second electronic device 1200 may be a DPP device, and it will be assumed that the first electronic device 1210 operates as both a configurator and an initiator, and the second electronic device 1200 operates as both an enrollee and a responder. In an embodiment, it will be assumed that the second electronic device 1200 is a DPP device to be activated as a new configurator.

In operation 1211, the second electronic device 1200 operating as both the enrollee and the responder may transmit a DPP presence announcement frame. In an embodiment, the DPP presence announcement frame may be used to signal, to the initiator which is the configurator, that the responder is ready to participate in DPP exchange, and may include DPP bootstrapping information. In an embodiment, the DPP presence announcement frame may be implemented as a DPP public action frame. In an embodiment, the DPP bootstrapping information may include a hash including a public bootstrapping key of a transmitter, e.g., the responder (e.g., the second electronic device 1200). In an embodiment, the hash including the public bootstrapping key of the responder may be secure information used in a DPP bootstrapping operation. In an embodiment, a hash for the DPP presence announcement frame to prevent leakage of a hash of a public key of a unprovisioned device may be SHA256 ("chirp"$|B_R$). In an embodiment, $B_R$ may represent a public bootstrapping key of the responder, for example, the second electronic device 1200.

In an embodiment, the DPP bootstrapping information may include network role information indicating a network role which a transmitter, e.g., a responder may support. In an embodiment, the network role may include at least one of an AP, an STA, and a configurator, and if the network roles which the responder may support are all of the AP, the STA, and the configurator, the network role information may indicate all of the AP, the STA, and the configurator. In an embodiment, the network role information may be included in the DPP presence announcement frame in a format of VSIE.

In operation 1213, the second electronic device 1200 may perform a listening operation on a specified channel during the DPP bootstrapping operation. During the DPP bootstrapping operation, in operation 1215, the first electronic device 1210 which operates as both the configurator and the initiator may use an OOB mechanism, for example, QR code scan, NFC tap, or BLE exchange to obtain DPP bootstrapping information from the second electronic device 1200. In an embodiment, the DPP bootstrapping information may include a public bootstrapping key ($B_R$) of the second electronic device 1200, a global operating class channel, and/or a channel list for DPP authentication. In an embodiment, the DPP bootstrapping information obtained through the OOB mechanism may include network role information indicating a network role which a transmitter, e.g., a responder may support. In an embodiment, the network role may include at least one of an AP, an STA, and a configurator, and if the network roles which the responder may support are all of the AP, the STA, and the configurator, the network role information may indicate all of the AP, the STA, and the configurator.

Figure 13:
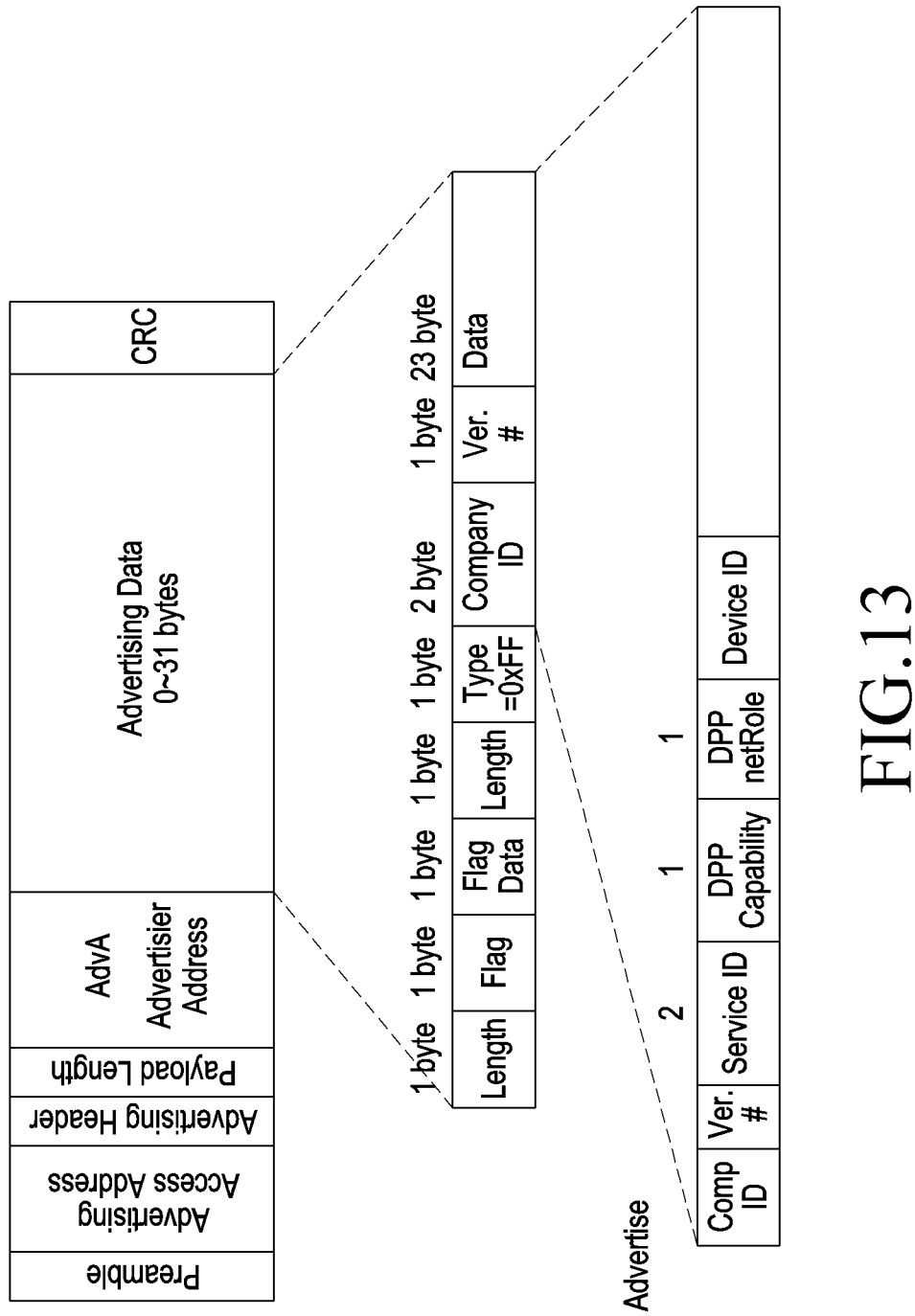
FIG. 13 is a diagram illustrating an example format of a BLE advertisement frame through which DPP bootstrapping information is transmitted in a DPP network according to various embodiments.

In an embodiment, if the second electronic device 1200 transmits the DPP bootstrapping information based on the BLE scheme, as shown in FIG. 13, the second electronic device 1200 may transmit the DPP bootstrapping information through a BLE advertisement frame. The second electronic device 1200 may transmit the DPP bootstrapping information through a data field included in an advertisement data field in the BLE advertisement frame, and the data field may include a service identifier (ID)(service id) field, a DPP capability field, and a DPP network role (DPP netRole) field.

In an embodiment, the data field included in the BLE advertisement frame may be expressed as shown in Table 3 below.

TABLE 3

| Data Field | Descriptions |
|---|---|
| Service ID | 0x111 = DPP |
| DPP Capability | B0: 0 = STA not supported, 1 = STA supported |
| | B1: 0 = AP not supported, 1 = AP supported |
| | B2: 0 = Configurator not supported, 1 = Configurator supported |
| | B3 . . . B7: Reserved |
| DPP netRole | netRole field indicating prefer configuring network role. (optional) |
| | 0 = STA |
| | 1 = AP |
| | 2 = Configurator |

In Table 3, a field value of the service ID field may be set to a value of "0x111" indicating a DPP.

In Table 3, a field value of the DPP capability field may be implemented in a form of 1-byte bitmap, a bit B0 may indicate whether it is supported for the second electronic device 1200 to operate as an STA, a bit B1 may indicate whether it is supported for the second electronic device 1200 to operate as an AP, and a bit B2 may indicate whether it is supported for the second electronic device 1200 to operate as a configurator.

In Table 3, the DPP network role field may indicate a network role which the second electronic device 1200 prefers, if a field value of the DPP network role field is set to "0", it may indicate that the second electronic device 1200 prefers to operate as an STA, if a field value of the DPP network role field is set to "1", it may indicate that the second electronic device 1200 prefers to operate as an AP, and if a field value of the DPP network role field is set to "2", it may indicate that the second electronic device 1200 prefers to operate as a configurator.

During the DPP bootstrapping operation, in operation 1215, the second electronic device 1200 may optionally announce presence of the second electronic device 1200 to help the first electronic device 1210 discover the second electronic device 1200. In operation 1217, the second electronic device 1200 may transmit a DPP presence announcement frame. For example, the second electronic device 1200 may periodically transmit the DPP presence announcement frame.

Through the above DPP bootstrapping operation, the first electronic device 1210 operating as the configurator may select an enrollee, e.g., the second electronic device 1200, which will operate as the new configurator in operation 1218. Although FIGS. 12A and 12B illustrate one enrollee for convenience of description, in an embodiment, a DPP bootstrapping operation may be performed among a configurator and a plurality of enrollees.

In an embodiment, the first electronic device 1210 may select the second electronic device 1200 from among the plurality of enrollees as the enrollee to be activated as the new configurator. In an embodiment, the first electronic device 1210 may select the enrollee to be activated as the new configurator based on network role information included in DPP bootstrapping information received from the plurality of enrollees.

In an embodiment, as the first electronic device 1210 selects the second electronic device 1200 as the enrollee to be activated as the new configurator based on the network role information obtained through the DPP presence announcement frame or the OOB mechanism, the first electronic device 1210 may transmit, to the second electronic device 1200, network role information indicating a network role for the second electronic device 1200 as a configurator through the OOB mechanism, e.g., an OOB message in operation 1219. In an embodiment, upon receiving the network role information indicating the configuration from the first electronic device 1210, the second electronic device 1200 may recognize that the second electronic device 1200 will operate as the configurator later.

In an embodiment, upon receiving the network role information indicating the network role as the configurator through the OOB message, the second electronic device 1200 may perform subsequent operations in consideration of operating as the configurator if the second electronic device 1200 performs a DPP configuration operation within set time from a time point at which the network role information is received.

In an embodiment, a DPP authentication operation may be performed between the first electronic device 1210 and the second electronic device 1200, and a DPP authentication operation (e.g., operations 1220 to 1231) performed between a configurator and an enrollee has been described in FIG. 7 (e.g., operations 719 to 731), a description of the DPP authentication operation performed between the first electronic device 1210 and the second electronic device 1200 may not be repeated here. In FIGS. 12A to 12B, the configurator delegation operation has been described based on an assumption that the second electronic device 1200 operates as the enrollee, so the DPP authentication operation is illustrated while assuming that the first electronic device 1210 initiates the DPP authentication operation, however, the disclosure is not limited thereto. For example, the second electronic device 1200 may not be the enrollee, and in this case, the DPP authentication operation may be also performed by the second electronic device 1200, not the first electronic device 1210.

In operation 1233, upon receiving the DPP authentication confirmation frame from the first electronic device 1210, the second electronic device 1200 may transmit a DPP configuration request frame to the first electronic device 1210. In an embodiment, the second electronic device 1200 has received the netRole parameter through the OOB mechanism, e.g., the OOB message in the DPP bootstrapping operation, so the second electronic device 1200 may identify that it is requested for the second electronic device 1200 to operate as the configurator. The second electronic device 1200 may include network role information into the DPP configuration request frame. In an embodiment, because it is requested to operate as the configurator from the first electronic device 1210, the second electronic device 1000 may include network role information, for example, network role information indicating a configurator into a DPP configuration request frame. In an embodiment, the second electronic device 1000 may include the network role information indicating the configurator in the DPP configuration request frame based on identifying that the second electronic device 1000 is selected to operate as the configurator. In an embodiment, the network role information may be implemented through a netRole parameter, and if a parameter value of the netRole parameter is set to "configurator", it may indicate that the network role is the configurator. In an embodiment, the DPP configuration request frame may include {E-nonce, configuration attributes(netRole="configurator")}$_{ke}$. In an embodiment, E-nonce may represent an E-nonce attribute, and configuration attributes may represent configuration attribute objects. A configuration attribute object may include at least one of a device name attribute, a Wi-Fi technology attribute, or a network role attribute. In an embodiment, {E-nonce, configuration attributes (netRole="configurator")}$_{ke}$ may represent E-nonce and configuration attributes (netRole="configurator") which are encrypted with ke.

According to an embodiment, the first electronic device 1210 receiving the DPP configuration request frame may identify that the second electronic device 1200 may operate as the configurator based on the netRole parameter included in the DPP configuration request frame. In an embodiment, the first electronic device 1210 may encrypt network configuration information, for example, a DPP configuration object, which is managed by the first electronic device 1210 based on a set encryption scheme to generate encrypted DPP configuration information, and generate DPPEnvelopedData including the encrypted DPP configuration information and the encryption scheme. In an embodiment, the encryption scheme may be a scheme based on an encryption key. According to an embodiment, in operation 1235, the first electronic device 1210 may include the DPPEnvelopedData into a payload of a DPP configuration response frame which is a response frame to the DPP configuration request frame, and transmit the DPP configuration response frame including the DPPEnvelopedData to the second electronic device 1200. In an embodiment, the DPP configuration object may be network configuration information, and may include at least one of a Wi-Fi technology object, a DPP discovery object, or a credential object, and the DPP discovery object may include, for example, operating or discovery information such as an SSID, an operating channel, or an operating band, and/or the like. In an embodiment, the DPP configuration response frame may include a DPP status field and {E-nonce, DPPEnvelopedData}$_{ke}$. In an embodiment, {E-nonce, DPPEnvelopedData}$_{ke}$ may represent E-nonce and DPPEnvelopedData which are encrypted with ke.

Upon receiving the DPP configuration response frame, the second electronic device 1200 may use the network configuration information managed by the first electronic device 1210 based on the DPPEnvelopedData included in the DPP configuration response frame, so the second electronic device 1200 may operate as the new configurator. In operation 1237, the second electronic device 1200 receiving the DPP configuration response frame may transmit a DPP configuration result frame to the first electronic device 1210. In an embodiment, the DPP configuration result frame may include {DPP Status, E-nonce}$_{ke}$. In an embodiment, {DPP Status, E-nonce}$_{ke}$ may represent DPP Status and E-nonce which are encrypted with ke.

Figure 14:
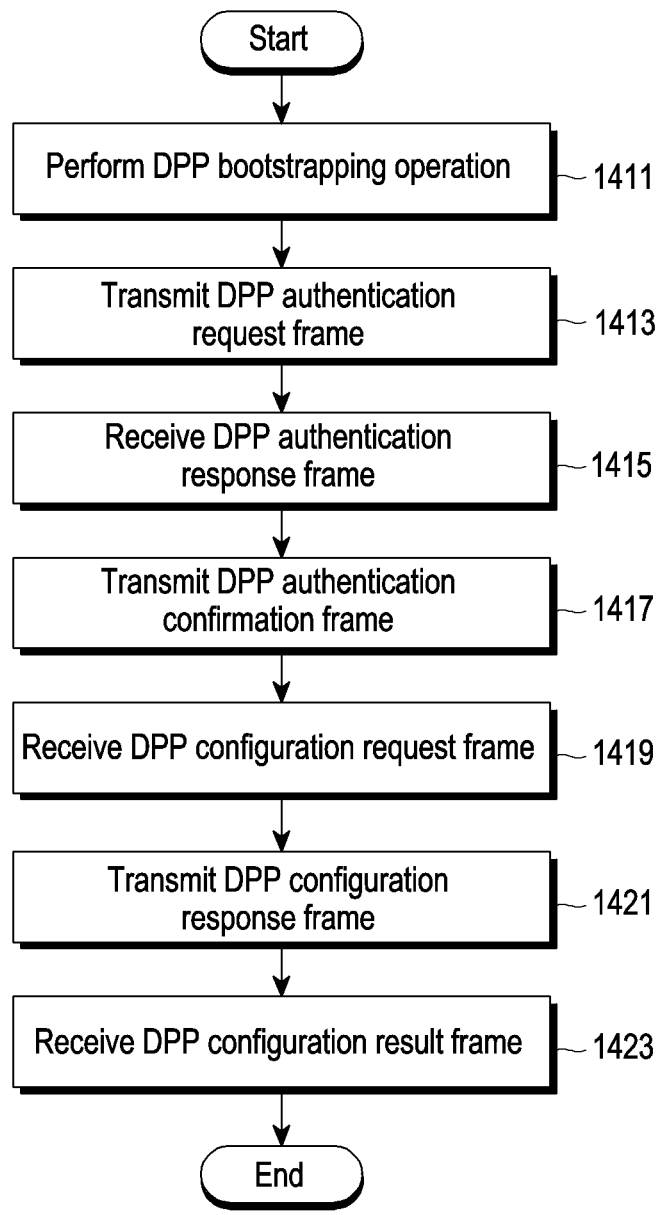
FIG. 14 is a flowchart illustrating an example method of operating an electronic device according to a configurator delegation operation in a DPP network according to various embodiments.

FIG. 14 is a flowchart illustrating an example operation process of an electronic device according to a configurator delegation operation in a DPP network according to various embodiments.

Referring to FIG. 14, in operation 1411, an electronic device (e.g., an electronic device 101 in FIG. 1 or a first electronic device 1110 in FIGS. 11A and 11B) may perform a DPP bootstrapping operation with an external electronic device (e.g., an electronic device 102 or an electronic device 104 in FIG. 1, or a second electronic device 1100 in FIGS. 11A and 11B). In FIG. 14, it will be assumed that the electronic device operates as both an initiator and a configurator, and the external electronic device operates as both a responder and an enrollee. Also, it will be assumed that the external electronic device is an enrollee to be operated as a new configurator. The DPP bootstrapping operation performed between a configurator and an enrollee has been described with reference to FIGS. 11A and 11B, a description of the DPP bootstrapping operation performed between the electronic device and the external electronic device may not be repeated here.

In operation 1413, the electronic device may transmit a DPP authentication request frame to the external electronic device. In an embodiment, the electronic device may include network role information indicating a network role for the external electronic device into the DPP authentication request frame in order to activate the external electronic device as the new configurator, for example, in order to delegate network management of the electronic device to the external electronic device. In an embodiment, the network role information may be included in the DPP authentication request frame in a format of VSIE. In an embodiment, the network role information may be implemented through a netRole parameter. In an embodiment, the DPP authentication request frame may include $SHA256(B_R)$, $SHA256(B_I)$, $P_I$, $\{I\text{-nonce, I-capabilities}\}_{k1}$, and netRole="configurator". For example, $SHA256(B_R)$ may represent a SHA256 hash for $B_R$, $B_I$ may represent a public bootstrapping key of the electronic device, $SHA256(B_I)$ may represent a SHA256 hash for $B_I$, $P_I$ may represent a public protocol key of the electronic device, I-nonce may represent an initiator nonce attribute, I-capabilities may represent an initiator capabilities attribute, k1 may represent a first intermediate key, and netRole may represent a network role for the external electronic device.

In operation 1415, the electronic device may receive, from the external electronic device, a DPP authentication response frame which is a response frame to the DPP authentication request frame. In an embodiment, the DPP authentication response frame may include a DPP status field, $SHA256(B_R)$, $[SHA256(B_I)]$, $P_R$, and $\{R\text{-nonce, I-nonce, R-capabilities, }\{R\text{-auth}\}_{ke}\}_{k2}$.

Upon receiving the DPP authentication response frame from the external electronic device, the electronic device may transmit a DPP authentication confirmation frame to the external electronic device in operation 1417. In an embodiment, the DPP authentication confirmation frame may include a DPP status field, $SHA256(B_R)$, $[SHA256(B_I)]$, and $\{I\text{-auth}\}_{ke}$. In an embodiment, operation 1417 may be omitted if necessary.

In operation 1419, the electronic device may receive a DPP configuration request frame from the external electronic device. In an embodiment, the external electronic device has received a netRole parameter through the DPP authentication request frame in a DPP authentication operation, thus may identify that the external electronic device is requested to operate as a configurator based on the netRole parameter. In an embodiment, if the external electronic device is requested to operate as the configurator from the electronic device, the external electronic device may include network role information indicating the configurator into the DPP configuration request frame. In an embodiment, if the external electronic device is requested to operate as the configurator from the electronic device and the external electronic device is capable of operating as the configurator, the external electronic device may include the network role information indicating the configurator into the DPP configuration request frame. In an embodiment, the DPP configuration request frame may include $\{E\text{-nonce, configuration attributes(netRole="configurator")}\}_{ke}$.

Upon receiving the DPP configuration request frame, the electronic device may identify that the external electronic device is capable of operating as the configurator based on the netRole parameter included in the DPP configuration request frame and transmit a DPP configuration response frame in operation 1421. In an embodiment, the electronic device may encrypt managed network configuration information, e.g., a DPP configuration object based on a set encryption scheme to generate encrypted DPP configuration information and generate DPPEnvelopedData including the encrypted DPP configuration information and the encryption scheme. In an embodiment, the encryption scheme may be a scheme which is based on an encryption key. The electronic device may include DPPEnvelopedData in a payload of a DPP configuration response frame which is a response frame to the DPP configuration request frame, and transmit the DPP configuration response frame including DPPEnvelopedData to the external electronic device. In an embodiment, the DPP configuration object may include at least one of a Wi-Fi technology object, a DPP discovery object, or a credential object as the network configuration information, and the DPP discovery object may include, for example, operating or discovery information such as an SSID, an operating channel, or an operating band. In an embodiment, the DPP configuration response frame may include a DPP status field and $\{E\text{-nonce, DPPEnvelopedData}\}_{ke}$. In an embodiment, $\{E\text{-nonce, DPPEnvelopedData}\}_{ke}$ may represent E-nonce and DPPEnvelopedData which are encrypted with ke.

In operation 1423, the electronic device may receive a DPP configuration result frame from the external electronic device. In an embodiment, the DPP configuration result frame may include $\{DPP\text{ Status, E-nonce}\}_{ke}$.

Figure 15:
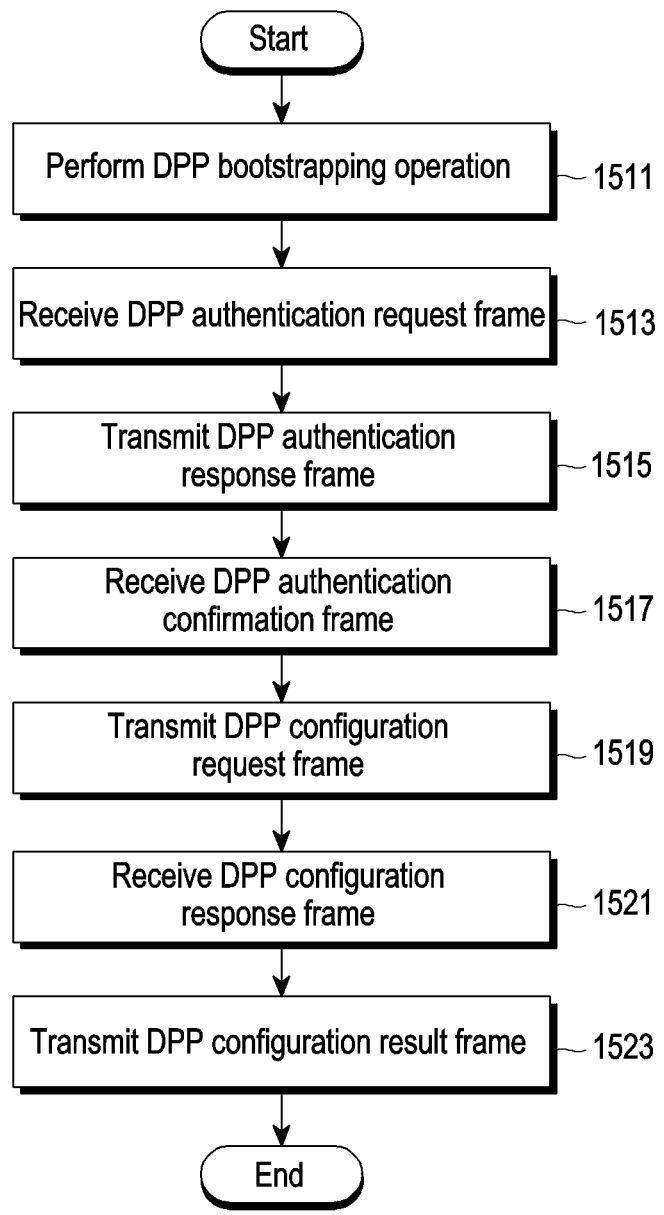
FIG. 15 is a flowchart illustrating an example of method of operating an electronic device according to a configurator delegation operation in a DPP network according to various embodiments.

FIG. 15 is a flowchart illustrating an example operation process of an electronic device according to a configurator delegation operation in a DPP network according to various embodiments.

Referring to FIG. 15, in operation 1511, an electronic device (e.g., an electronic device 101 in FIG. 1 or a second electronic device 1100 in FIGS. 11A and 11B) may perform a DPP bootstrapping operation with an external electronic device (e.g., an electronic device 102 or an electronic device 104 in FIG. 1, or a first electronic device 1110 in FIGS. 11A and 11B). In FIG. 15, it will be assumed that the electronic device operates as both a responder and an enrollee, and the external electronic device operates as both an initiator and a configurator. Also, it will be assumed that the electronic device is an enrollee to be operated as a new configurator. A DPP bootstrapping operation performed between a configurator and an enrollee has been described with reference to FIGS. 11A and 11B, a description of the DPP bootstrapping operation performed between the electronic device and the external electronic device may not be repeated here.

In operation 1513, the electronic device may receive a DPP authentication request frame from the external electronic device. In an embodiment, the external electronic device may include network role information indicating a network role for the electronic device into the DPP authentication request frame in a format of VSIE in order to activate the electronic device as the new configurator, for example, in order to delegate network management of the external electronic device to the electronic device. In an embodiment, the external electronic device performs a configurator delegation operation for activating the electronic device as the new configurator, so a parameter value of a netRole parameter included in the DPP authentication request frame may be set to "configurator". In an embodiment, the DPP authentication request frame may include SHA256($B_R$), SHA256($B_I$), $P_I$, {I-nonce, I-capabilities}$_{k1}$, and netRole="configurator". For example, SHA256($B_R$) may represent a SHA256 hash for $B_R$, $B_I$ may represent a public bootstrapping key of the external electronic device, SHA256($B_I$) may represent a SHA256 hash for $B_I$, $P_I$ may represent a public protocol key of the external electronic device, I-nonce may represent an initiator nonce attribute, I-capabilities may represent an initiator capabilities attribute, k1 may represent a first intermediate key, and netRole may represent a network role for the electronic device.

In operation 1515, the electronic device may transmit, to the external electronic device, a DPP authentication response frame which is a response frame to the DPP authentication request frame. In an embodiment, the DPP authentication response frame may include a DPP status field, SHA256($B_R$), [SHA256($B_I$)], $P_R$, and {R-nonce, I-nonce, R-capabilities, {R-auth}$_{ke}$}$_{k2}$.

In operation 1517, the electronic device which has transmitted the DPP authentication response frame to the external electronic device may receive a DPP authentication confirmation frame from the external electronic device. In an embodiment, the DPP authentication confirmation frame may include a DPP status field, SHA256($B_R$), [SHA256($B_I$)], and {I-auth}$_{ke}$. In an embodiment, operation 1517 may be omitted if necessary.

In operation 1519, the electronic device may transmit a DPP configuration request frame to the external electronic device. In an embodiment, the electronic device may receive a netRole parameter through the DPP authentication request frame in a DPP authentication operation, thus may identify that the electronic device is requested to operate as a configurator based on the received netRole parameter. If the electronic device is capable of operating as the configurator, the electronic device may include network role information into the DPP configuration request frame, and thus the external electronic device may identify the network role information of the electronic device. In an embodiment, if the electronic device is requested to operate as the configurator from the external electronic device, the electronic device may include the network role information indicating the configurator into the DPP configuration request frame. In an embodiment, if the electronic device is requested to operate as the configurator from the external electronic device and the electronic device is capable of operating as the configurator, the electronic device may include the network role information indicating the configurator into the DPP configuration request frame. In an embodiment, the DPP configuration request frame may include {E-nonce, configuration attributes(netRole="configurator")}$_{ke}$.

In operation 1521, the electronic device may receive a DPP configuration response frame which is a response frame to the DPP configuration request frame. In an embodiment, upon receiving the DPP configuration request frame, the external electronic device may identify that the electronic device is capable of operating as the configurator based on the netRole parameter included in the DPP configuration request frame. In an embodiment, the external electronic device may encrypt managed network configuration information, e.g., a DPP configuration object based on a set encryption scheme to generate encrypted DPP configuration information and generate DPPEnvelopedData including the encrypted DPP configuration information and the encryption scheme. In an embodiment, the encryption scheme may be a scheme which is based on an encryption key. The external electronic device may include DPPEnvelopedData into a payload of a DPP configuration response frame which is a response frame to the DPP configuration request frame, and transmit the DPP configuration response frame including DPPEnvelopedData to the electronic device. In an embodiment, the DPP configuration object may include at least one of a Wi-Fi technology object, a DPP discovery object, or a credential object as the network configuration information, and the DPP discovery object may include, for example, operating or discovery information such as an SSID, an operating channel, an operating band, and/or the like. In an embodiment, the DPP configuration response frame may include a DPP status field and {E-nonce, DPPEnvelopedData}$_{ke}$. In an embodiment, {E-nonce, DPPEnvelopedData}$_{ke}$ may represent E-nonce and DPPEnvelopedData which are encrypted with ke. Accordingly, the electronic device may store the DPP configuration information managed by the external electronic device by decrypting DPPEnvelopedData included in the DPP configuration response frame, thereby the electronic device may be activated as the configurator.

In operation 1523, the electronic device may transmit a DPP configuration result frame to the external electronic device. In an embodiment, the DPP configuration result frame may include {DPP Status, E-nonce}$_{ke}$.

Figure 16:
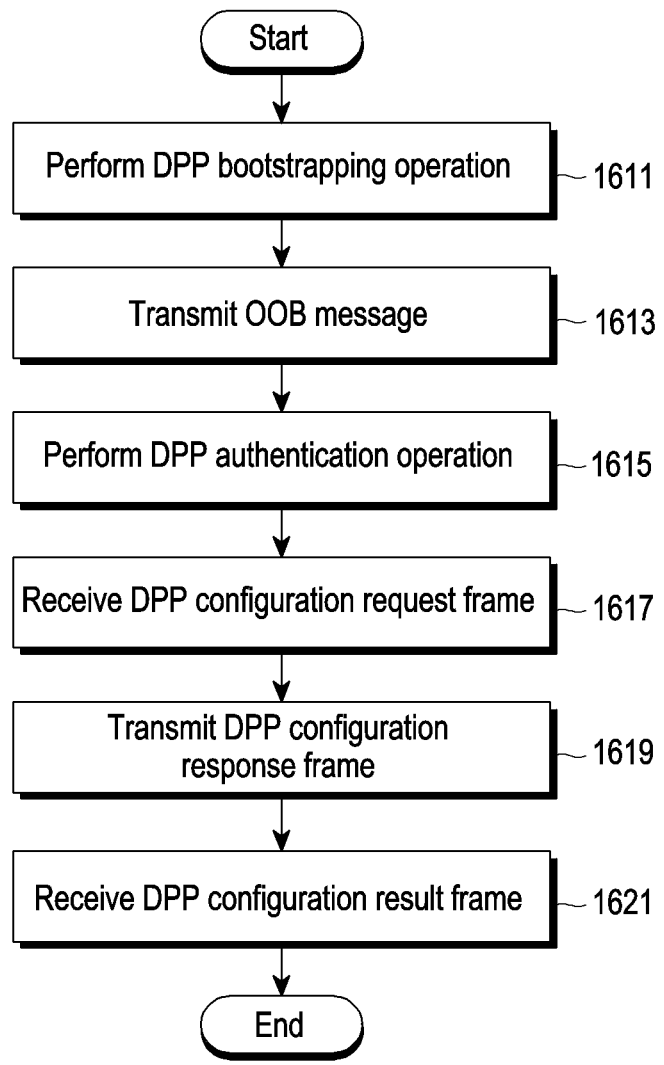
FIG. 16 is a flowchart illustrating an example method of operating an electronic device according to a configurator delegation operation in a DPP network according to various embodiments.

FIG. 16 is a flowchart illustrating an example operation process of an electronic device according to a configurator delegation operation in a DPP network according to various embodiments.

Referring to FIG. 16, in operation 1611, an electronic device (e.g., an electronic device 101 in FIG. 1 or a first electronic device 1210 in FIGS. 12A and 12B) may perform a DPP bootstrapping operation with an external electronic device (e.g., an electronic device 102 or an electronic device 104 in FIG. 1, or a second electronic device 1200 in FIGS. 12A and 12B). In FIG. 16, it will be assumed that the electronic device operates as both an initiator and a configurator, and the external electronic device operates as both a responder and an enrollee. Also, it will be assumed that the external electronic device is an enrollee to be operated as a new configurator. A DPP bootstrapping operation performed between a configurator and an enrollee has been described with reference to FIGS. 12A and 12B, a description of the DPP bootstrapping operation performed between the electronic device and the external electronic device may not be repeated here.

As the DPP bootstrapping operation is performed, the electronic device may obtain DPP bootstrapping information of the external electronic device through a DPP presence announcement frame or an OOB mechanism, and the DPP bootstrapping information may include network role information of the external electronic device. The electronic device may select an enrollee to be operated as a configurator based on the network role information of the external electronic device, and thus, in operation 1613, the electronic device may transmit, to the external electronic device through the OOB mechanism, e.g., an OOB message, network role information indicating a network role of the external electronic device as a configurator.

In operation 1615, the electronic device may perform a DPP authentication operation with the external electronic device. A DPP authentication operation performed between a configurator and an enrollee has been described in operations 719 to 731 in FIG. 7 and operations 1220 to 1231 in FIGS. 12A and 12B, so a description of the DPP authentication operation performed between the electronic device and the external electronic device may not be repeated here.

In operation 1617, the electronic device may receive a DPP configuration request frame from the external electronic device. In an embodiment, the external electronic device has received a netRole parameter through the OOP mechanism, e.g., the OOB message in a DPP bootstrapping operation, thus may identify that the external electronic device is requested to operate as the configurator based on the netRole parameter. In an embodiment, if the external electronic device is requested to operate as the configurator from the electronic device, the external electronic device may include network role information indicating the configurator into a DPP configuration request frame. In an embodiment, if the external electronic device is requested to operate as the configurator from the electronic device and the external electronic device is capable of operating as the configurator, the external electronic device may include network role information indicating the configurator into the DPP configuration request frame. In an embodiment, the DPP configuration request frame may include {E-nonce, configuration attributes(netRole="configurator")}$_{ke}$.

Upon receiving the DPP configuration request frame, the electronic device may identify that the external electronic device is capable of operating as the configurator based on the netRole parameter included in the DPP configuration request frame and transmit a DPP configuration response frame in operation 1619. In an embodiment, the electronic device may encrypt managed network configuration information, e.g., a DPP configuration object based on a set encryption scheme to generate encrypted DPP configuration information and generate DPPEnvelopedData including the encrypted DPP configuration information and the encryption scheme. In an embodiment, the encryption scheme may be a scheme which is based on an encryption key. The electronic device may include DPPEnvelopedData into a payload of a DPP configuration response frame which is a response frame to the DPP configuration request frame, and transmit the DPP configuration response frame including the DPPEnvelopedData to the external electronic device. In an embodiment, the DPP configuration object may include at least one of a Wi-Fi technology object, a DPP discovery object, or a credential object as the network configuration information, and the DPP discovery object may include, for example, operating or discovery information such as an SSID, an operating channel, or an operating band. In an embodiment, the DPP configuration response frame may include a DPP status field and {E-nonce, DPPEnvelopedData}$_{ke}$. In an embodiment, {E-nonce, DPPEnvelopedData}$_{ke}$ may represent E-nonce and DPPEnvelopedData which are encrypted with ke.

In operation 1621, the electronic device may receive a DPP configuration result frame from the external electronic device. In an embodiment, the DPP configuration result frame may include {DPP Status, E-nonce}$_{ke}$.

Figure 17:
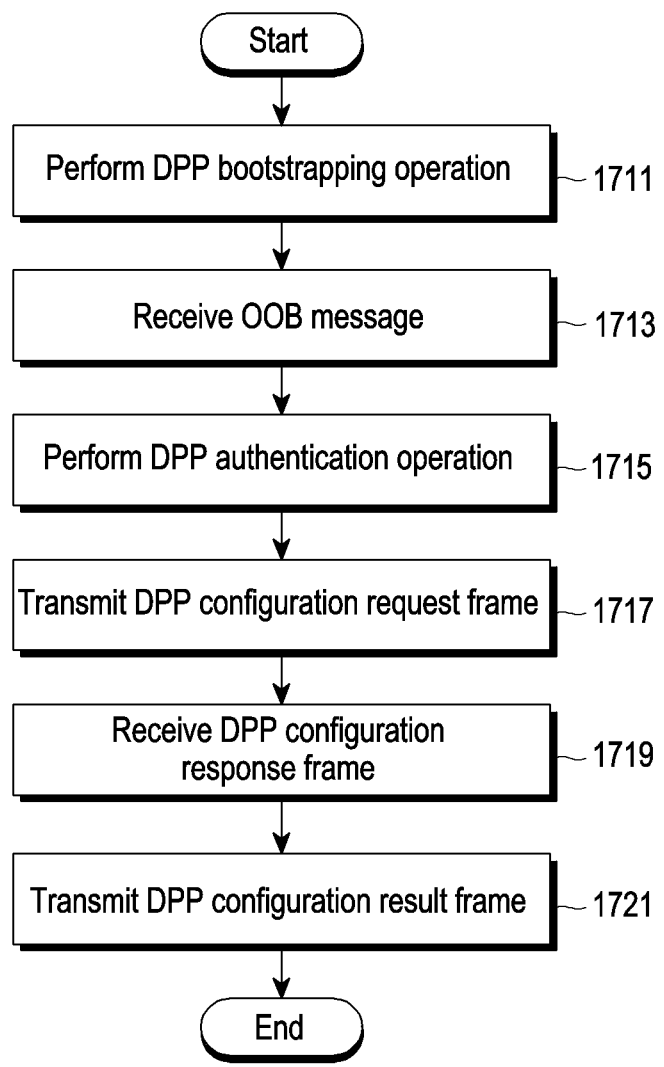
FIG. 17 is a flowchart illustrating an example method of operating an electronic device according to a configurator delegation operation in a DPP network according to various embodiments.

FIG. 17 is a flowchart illustrating an example operation process of an electronic device according to a configurator delegation operation in a DPP network according to various embodiments.

Referring to FIG. 17, in operation 1711, an electronic device (e.g., an electronic device 102 or an electronic device 104 in FIG. 1 or a second electronic device 1200 in FIGS. 12A and 12B) may perform a DPP bootstrapping operation with an external electronic device (e.g., an electronic device 101 in FIG. 1, or a first electronic device 1210 in FIGS. 12A and 12B). In FIG. 17, it will be assumed that the electronic device operates as both a responder and an enrollee, and the external electronic device operates as both an initiator and a configurator. Also, it will be assumed that the electronic device is an enrollee to be operated as a new configurator. A DPP bootstrapping operation performed between a configurator and an enrollee has been described with reference to FIGS. 12A and 12B, a description of the DPP bootstrapping operation performed between the electronic device and the external electronic device may not be repeated here.

As the DPP bootstrapping operation is performed, the external electronic device may obtain DPP bootstrapping information of the electronic device through a DPP presence announcement frame or an OOB mechanism, and the DPP bootstrapping information may include network role information of the electronic device. The external electronic device may select the electronic device as an enrollee to be operated as a configurator based on the network role information of the electronic device, and thus, in operation 1713, the electronic device may receive, from the external electronic device through the OOB mechanism, e.g., an OOB message, network role information indicating a network role for the electronic device as a configurator.

In operation 1715, the electronic device may perform a DPP authentication operation with the external electronic device. A DPP authentication operation performed between a configurator and an enrollee has been described in operations 719 to 731 in FIG. 7 and operations 1220 to 1231 in FIGS. 12A and 12B, a description of the DPP authentication operation performed between the electronic device and the external electronic device may not be repeated here.

In operation 1717, the electronic device may transmit a DPP configuration request frame to the external electronic device. In an embodiment, the electronic device has received a netRole parameter through the OOP mechanism, e.g., the OOB message in a DPP bootstrapping operation, thus may identify that the electronic device is requested to operate as a configurator based on the netRole parameter. The electronic device may include network role information into the DPP configuration request frame, so the external electronic device may identify the network role information of the electronic device. In an embodiment, if the electronic device is requested to operate as the configurator from the external electronic device, the electronic device may transmit, to the external electronic device, the DPP configuration request frame including network role information indicating the configurator. In an embodiment, if the electronic device is requested to operate as the configurator from the external electronic device and the electronic device is capable of operating as the configurator, the electronic device may transmit, to the external electronic device, the DPP configuration request frame including network role information indicating the configurator. In an embodiment, the DPP configuration request frame may include {E-nonce, configuration attributes(netRole="configurator")}$_{ke}$.

Upon receiving the DPP configuration request frame, the external electronic device may identify that the external electronic device is capable of operating as the configurator based on the netRole parameter included in the DPP configuration request frame. In an embodiment, the external electronic device may encrypt managed network configuration information, e.g., a DPP configuration object based on a set encryption scheme to generate encrypted DPP configuration information and generate DPPEnvelopedData including the encrypted DPP configuration information and the encryption scheme. In an embodiment, the encryption scheme may be a scheme which is based on an encryption key. The external electronic device may include DPPEnvelopedData into a payload of a DPP configuration response frame which is a response frame to the DPP configuration request frame, and transmit the DPP configuration response frame including DPPEnvelopedData to the electronic device, thereby the electronic device may receive the DPP configuration response frame in operation 1719. In an embodiment, the DPP configuration object may include at least one of a Wi-Fi technology object, a DPP discovery object, or a credential object as the network configuration information, and the DPP discovery object may include, for example, operating or discovery information such as an SSID, an operating channel, or an operating band. In an embodiment, the DPP configuration response frame may include a DPP status field and {E-nonce, DPPEnvelopedData}$_{ke}$. In an embodiment, {E-nonce, DPPEnvelopedData}$_{ke}$ may represent E-nonce and DPPEnvelopedData which are encrypted with ke.

In operation 1721, the electronic device may transmit a DPP configuration result frame to the external electronic device. In an embodiment, the DPP configuration result frame may include {DPP Status, E-nonce}$_{ke}$.

Through FIGS. 9 to 17, various operations in a case that a configurator sets a network role of an enrollee as a configurator in a DPP network have been described, however, the configurator may set the network role of the enrollee as other network roles, e.g., an AP or a STA as well as the configurator. In an embodiment, in the DPP network, DPP devices such as a Wi-Fi AP may generally operate in a fixed network role as an AP, however, there may be DPP devices, such as a mobile device, capable of operating in two modes such as a mobile hotspot or a Wi-Fi station. If there are DPP devices capable of operating in various modes as described above, the configurator may set a network role for a corresponding enrollee so that the corresponding enrollee may operate in a network role desired by the configurator. In particular, in a case of a configurator delegation operation in a DPP network, a specific DPP device may need to perform an operation as an enrollee in order to activate the specific DPP device as a new configurator, so a configurator may set a network role for the enrollee to cause the enrollee to operate preferentially in a network role set by the configurator.

According to various example embodiments of the disclosure, a method performed by an electronic device (e.g., an electronic device 101) may comprise: determining a network role of an external electronic device (e.g., an electronic device 102 or an electronic device 104), transmitting, to the external electronic device, an authentication request message including network role information indicating the network role, receiving, from the external electronic device, an authentication response message to the authentication request message, receiving, from the external electronic device, a configuration request message including network role information of the external electronic device and requesting network configuration information, generating network configuration information to be transmitted to the external electronic device corresponding to the network role information, and transmitting, to the external electronic device, a configuration response message including the generated network configuration information.

According to various example embodiments of the disclosure, based on the network role information of the external electronic device indicating a configurator, generating the network configuration information to be transmitted to the external electronic device corresponding to the network role information may include generating the network configuration information to be transmitted to the external electronic device as envelope network configuration information, and the envelope network configuration information may include encrypted network configuration information generated by encrypting network configuration information managed by the electronic device based on an encryption scheme, and information about the encryption scheme.

According to various example embodiments of the disclosure, the information about the encryption scheme may include an encryption key.

According to various example embodiments of the disclosure, determining the network role of the external electronic device may include determining the network role of the external electronic device based on information input via a UI.

According to various example embodiments of the disclosure, determining the network role of the external electronic device may include receiving, from the external electronic device, a presence announcement message including capability information indicating a network role supportable in the external electronic device, and determining the network role of the external electronic device based on the capability information.

According to various example embodiments of the disclosure, determining the network role of the external electronic device may include receiving from the external electronic device, an out-of-band (OOB) message including capability information indicating a network role supportable in the external electronic device, and determining the network role of the external electronic device based on the capability information.

According to various example embodiments of the disclosure, based on the network role information of the external electronic device indicating an AP or an STA, generating the network configuration information to be transmitted to the external electronic device based on the network role information may include generating the network configuration information to be transmitted to the external electronic device as network configuration information managed by the electronic device.

According to various example embodiments of the disclosure, a method performed by an electronic device (e.g., an electronic device 101) may comprise: determining a network role of an external electronic device (e.g., an electronic device 102 or an electronic device 104), transmitting, to the external electronic device, an out-of-band (OOB) message including network role information indicating the network role, performing an authentication operation with the external electronic device, receiving, from the external electronic device, a configuration request message including network role information of the external electronic device and requesting network configuration information, generating network configuration information to be transmitted to the external electronic device corresponding to the network role information, and transmitting, to the external electronic device, a configuration response message including the generated network configuration information.

According to various example embodiments of the disclosure, based on the network role information of the external electronic device indicating a configurator, generating the network configuration information to be transmitted to the external electronic device corresponding to the network role information may comprise generating the network configuration information to be transmitted to the external electronic device as envelope network configuration information, and the envelope network configuration information may include encrypted network configuration information generated by encrypting network configuration information managed by the electronic device based on an encryption scheme, and information about the encryption scheme.

According to various example embodiments of the disclosure, the information about the encryption scheme may include an encryption key.

According to various example embodiments of the disclosure, determining the network role of the external electronic device may comprise determining the network role of the external electronic device based on information input via a UI.

According to various example embodiments of the disclosure, determining the network role of the external electronic device may comprise receiving, from the external electronic device, a presence announcement message including capability information indicating a network role supportable in the external electronic device, and determining the network role of the external electronic device based on the capability information.

According to various example embodiments of the disclosure, based on the network role information of the external electronic device indicating an AP or an STA, generating the network configuration information to be transmitted to the external electronic device corresponding to the network role information may comprise generating the network configuration information to be transmitted to the external electronic device as network configuration information managed by the electronic device.

According to various example embodiments of the disclosure, a method performed by an electronic device (e.g., an electronic device 101) may comprise: receiving, from an external electronic device (e.g., an electronic device 102 or 104), an authentication request message including network role information indicating a network role of the electronic device, transmitting, to the external electronic device, an authentication response message to the authentication request message, transmitting, to the external electronic device, a configuration request message including network role information of the electronic device and requesting network configuration information, and receiving, from the external electronic device, a configuration response message including network configuration information determined corresponding to the network role information of the electronic device.

According to various example embodiments of the disclosure, based on the network role information of the electronic device indicating a configurator, the network configuration information included in the configuration response message may include envelope network configuration information, and the envelope network configuration information may include encrypted network configuration information generated by encrypting network configuration information managed by the external electronic device based on an encryption scheme, and information about the encryption scheme.

According to various example embodiments of the disclosure, the information about the encryption scheme may include an encryption key.

According to various example embodiments of the disclosure, the method may further comprise transmitting, to the external electronic device, a presence announcement message including capability information indicating a network role supportable in the electronic device, and the network role of the electronic device may be determined based on the capability information.

According to various example embodiments of the disclosure, the method may further comprise transmitting, to the external electronic device, an OOB message including capability information indicating a network role supportable in the electronic device, and the network role of the electronic device may be determined based on the capability information.

According to various example embodiments of the disclosure, the OOB message may be a BLE advertisement message, and the BLE advertisement message may include information indicating a network role preferred by the electronic device.

According to various example embodiments of the disclosure, based on the network role information of the electronic device indicating an AP or an STA, the network configuration information included in the configuration response message may include network configuration information managed by the external electronic device.

According to various example embodiments of the disclosure, a method performed by an electronic device (e.g., an electronic device 101) may comprise: receiving, from an external electronic device (e.g., an electronic device 102 or 104), an OOB message including network role information indicating a network role of the electronic device, performing an authentication operation with the electronic device, transmitting, to the external electronic device, a configuration request message including network role information of the electronic device and requesting network configuration information, and receiving, from the external electronic device, a configuration response message including network configuration information determined corresponding to the network role information of the electronic device.

According to various example embodiments of the disclosure, based on the network role information of the electronic device indicating a configurator, the network configuration information included in the configuration response message may include envelope network configuration information, and the envelope network configuration information may include encrypted network configuration information generated by encrypting network configuration information managed by the external electronic device based on an encryption scheme, and information about the encryption scheme.

According to various example embodiments of the disclosure, the information about the encryption scheme includes an encryption key.

According to various example embodiments of the disclosure, the method may further comprise transmitting, to the external electronic device, a presence announcement message including capability information indicating a network role supportable in the electronic device, and the network role of the electronic device may be determined based on the capability information.

According to various example embodiments of the disclosure, based on the network role information of the electronic device indicating an AP or an STA, the network configuration information included in the configuration response message may include network configuration information managed by the external electronic device.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
a communication circuit;
at least one processor, including processing circuitry, operatively connected with the communication circuit; and
memory storing instructions, wherein the instructions, when executed by at least one processor, cause the electronic device to:
determine, while the electronic device operates as an activated configurator, a network role of an external electronic device operating as an enrollee, the network role including one of an AP, an STA, or a configurator,
transmit, to the external electronic device via the communication circuit, an authentication request message including information indicating the network role,
receive, from the external electronic device via the communication circuit, an authentication response message to the authentication request message,
receive, from the external electronic device via the communication circuit, a configuration request message including network role information of the external electronic device and requesting network configuration information, the network role information included in the configuration request message including a parameter to indicate one of the AP, the STA, or the configurator determined based on the information indicating the network role,
generate network configuration information to be transmitted to the external electronic device corresponding to the network role information included in the configuration request message, and
transmit, to the external electronic device via the communication circuit, a configuration response message, including the generated network configuration information,
wherein the instructions, when executed by the at least one processor, cause the electronic device to:
based on the network role information of the external electronic device indicating a configurator, generate the network configuration information to be transmitted to the external electronic device as envelope network configuration information for provisioning the external electronic device as another activated configurator.

2. The electronic device of claim 1,
wherein the envelope network configuration information includes encrypted network configuration information generated by encrypting network configuration information managed by the electronic device based on an encryption scheme, and information about the encryption scheme.

3. The electronic device of claim 2, wherein the information about the encryption scheme includes an encryption key.

4. The electronic device of claim 1, wherein the instructions, when executed by at least one processor, cause the electronic device to:
determine the network role of the external electronic device based on information input via a user interface (UI).

5. The electronic device of claim 1, wherein the instructions, when executed by at least one processor, cause the electronic device to:
receive, from the external electronic device via the communication circuit, a presence announcement message including capability information indicating a network role supportable in the external electronic device, and
determine the network role of the external electronic device based on the capability information.

6. The electronic device of claim 1, wherein the instructions, when executed by at least one processor, cause the electronic device to:
receive, from the external electronic device via the communication circuit, an out-of-band (OOB) message including capability information indicating a network role supportable in the external electronic device, and
determine the network role of the external electronic device based on the capability information.

7. The electronic device of claim 1, wherein the instructions, when executed by at least one processor, cause the electronic device to:
based on the network role information of the external electronic device indicating the AP or the STA, generate the network configuration information to be transmitted to the external electronic device as network configuration information managed by the electronic device.

8. An electronic device, comprising:
a communication circuit;
at least one processor, including processing circuitry, operatively connected with the communication circuit; and
memory storing instructions, wherein the instructions, executed by the at least one processor, cause the electronic device to:
determine, while the electronic device operates as an activated configurator, a network role of an external electronic device operating as an enrollee, the network role including one of an AP, an STA, or a configurator,
transmit, to the external electronic device via the communication circuit, an out-of-band (OOB) message including information indicating the network role of the external electronic device,
perform, via the communication circuit, an authentication operation with the external electronic device,
receive, from the external electronic device via the communication circuit, a configuration request message including network role information of the external electronic device and requesting network configuration information, the network role information included in the configuration request message including a parameter indicator configurable to indicate one of the AP, the STA, or the configurator determined based on the information indicating the network role,
generate network configuration information to be transmitted to the external electronic device corresponding to the network role information included in the configuration request message, and
transmit, to the external electronic device via the communication circuit, a configuration response message including the generated network configuration information,
wherein the instructions, when executed by the at least one processor, cause the electronic device to:

based on the network role information of the external electronic device indicating a configurator, generate the network configuration information to be transmitted to the external electronic device as envelope network configuration information for provisioning the external electronic device as another activated configurator.

9. The electronic device of claim 8, wherein the envelope network configuration information includes encrypted network configuration information generated by encrypting network configuration information managed by the electronic device based on an encryption scheme, and information about the encryption scheme.

10. The electronic device of claim 9, wherein the information about the encryption scheme includes an encryption key.

11. The electronic device of claim 8, wherein the instructions, when executed by at least one processor, cause the electronic device to:
determine the network role of the external electronic device based on information input via a user interface (UI).

12. The electronic device of claim 8, wherein the instructions, when executed by at least one processor, cause the electronic device to:
receive, from the external electronic device via the communication circuit, a presence announcement message including capability information indicating a network role supportable in the external electronic device, and
determine the network role of the external electronic device based on the capability information.

13. The electronic device of claim 8, wherein the instructions, when executed by at least one processor, cause the electronic device to:
based on the network role information of the external electronic device indicating the AP or the STA, generate the network configuration information to be transmitted to the external electronic device as network configuration information managed by the electronic device.

14. An electronic device, comprising:
a communication circuit;
at least one processor, including processing circuitry, operatively connected with the communication circuit; and
memory storing instructions, wherein the instructions, when executed by the at least one processor, cause the electronic device to:
while the electronic device operates as an enrollee, receive, via the communication circuit, from an external electronic device operating an as activated configurator, an authentication request message including information indicating a network role of the electronic device, the network role including one of an AP, an STA, or a configurator,
transmit, to the external electronic device via the communication circuit, an authentication response message to the authentication request message,
transmit, to the external electronic device via the communication circuit, a configuration request message including network role information of the electronic device and requesting network configuration information, the network role information included in the configuration request message including a parameter indicator configurable to indicate one of the AP, the STA, or the configurator determined based on the information indicating the network role, and
receive, from the external electronic device via the communication circuit, a configuration response message including network configuration information determined corresponding to the network role information of the electronic device included in the configuration request message,
wherein, based on the network role information of the electronic device indicating a configurator, the network configuration information included in the configuration response message includes envelope network configuration information for provisioning the electronic device as another activated configurator.

15. The electronic device of claim 14,
wherein the envelope network configuration information includes encrypted network configuration information generated by encrypting network configuration information managed by the external electronic device based on an encryption scheme, and information about the encryption scheme.

16. The electronic device of claim 15, wherein the information about the encryption scheme includes an encryption key.

17. The electronic device of claim 14, wherein the instructions, when executed by at least one processor, cause the electronic device to:
transmit, to the external electronic device via the communication circuit, a presence announcement message including capability information indicating a network role supportable in the electronic device, and
wherein the network role of the electronic device is determined based on the capability information.

18. The electronic device of claim 14, wherein the instructions, when executed by at least one processor, cause the electronic device to:
transmit, to the external electronic device via the communication circuit, an out-of-band (OOB) message including capability information indicating a network role supportable in the electronic device, and
wherein the network role of the electronic device is determined based on the capability information.

19. The electronic device of claim 18, wherein the OOB message comprises a Bluetooth low energy (BLE) advertisement message, and
wherein the BLE advertisement message includes information indicating a network role preferred by the electronic device.

20. The electronic device of claim 14, wherein, based on the network role information of the electronic device indicating the AP or the STA, the network configuration information included in the configuration response message includes network configuration information managed by the external electronic device.

* * * * *